(12) United States Patent
Aoki et al.

(10) Patent No.: US 6,757,255 B1
(45) Date of Patent: Jun. 29, 2004

(54) APPARATUS FOR AND METHOD OF MEASURING COMMUNICATION PERFORMANCE

(75) Inventors: Takeshi Aoki, Tama (JP); Shinji Kikuchi, Kawasaki (JP); Eiichi Takahashi, Kawasaki (JP); Ken Yokoyama, Kawasaki (JP); Tsuneo Katsuyama, Kawasaki (JP); Tetsuya Okano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/361,249

(22) Filed: Jul. 27, 1999

(30) Foreign Application Priority Data

Jul. 28, 1998 (JP) .......................................... 10-213245
Sep. 30, 1998 (JP) .......................................... 10-278615

(51) Int. Cl.$^7$ .............................................. H04L 1/00
(52) U.S. Cl. ...................... 370/252; 370/229; 370/249; 370/389; 370/395.21; 370/355.52; 370/401; 709/102; 709/203
(58) Field of Search ................................ 370/232, 233, 370/234, 252, 389, 395.2, 395.21, 395.41, 395.52, 395.6, 395.61, 395.64, 395.65, 401, 402, 410, 229, 249; 709/102, 104, 203, 220, 221

(56) References Cited

U.S. PATENT DOCUMENTS 6,064,653 A * 5/2000 Farris ........................ 370/237
6,091,733 A * 7/2000 Takagi et al. ............... 370/401
6,195,046 B1 * 2/2001 Gilhousen .................... 342/457
6,215,772 B1 * 4/2001 Verma ......................... 370/236
6,243,761 B1 * 6/2001 Mogul et al. ............... 709/246
6,259,699 B1 * 7/2001 Opalka et al. .............. 370/398
6,266,337 B1 * 7/2001 Marco ......................... 370/410

* cited by examiner

Primary Examiner—Dang Ton
Assistant Examiner—Shick Hom
(74) Attorney, Agent, or Firm—Staas & Halsey LLP

(57) ABSTRACT

A TCP communications performance measuring device 2 obtains an effective bandwidth (a transfer speed) representing performance in TCP communications, wherein performance indexes or both of a round trip time and a maximum segment size which are obtained based on TCP communications variable-length packets transmitted and received pursuant to a TCP (Transmission Control Protocol) defined as protocol of a transport layer of the OSI Reference model, and any one of an average congestion window size, a packet discard rate and a packet discard event rate. The measuring device 2 therefore includes a packet monitoring unit, a performance index detecting unit 22, a session management unit 23, a session management table 24 and a performance calculating unit 25. The measuring device 2 is capable of measuring the performance in the TCP communications on a communications route of a network without specially transmitting the multiplicity of measurement-oriented packets to the network.

39 Claims, 18 Drawing Sheets

FIG.3

| TRANSMITTING/ RECEIVING TIME | ADDRESS | | PACKET CATEGORY | PACKET SIZE (BYTE) |
|---|---|---|---|---|
| | TRANSMITTING-SIDE COMMUNICATIONS DEVICE | RECEIVING-SIDE COMMUNICATIONS DEVICE | | |
| 14:23:52 | 13.204.301.562 | 20.213.223.442 | SYN | 34 |
| 14:24:03 | 20.213.223.442 | 13.204.301.562 | ACK | 34 |
| 14:24:10 | 13.204.301.562 | 20.213.223.442 | DATA | 512 |
| 14:24:12 | 41.213.223.442 | 13.204.301.562 | SYN | 34 |
| | | | | |

| | |
|---|---|
| NAME OF SESSION | (A, B) |
| ADDRESS OF TRANSMITTING-SIDE COMMUNICATIONS DEVICE | 13.204.301.562 |
| ADDRESS OF RECEIVING-SIDE COMMUNICATIONS DEVICE | 20.213.223.442 |
| SESSIONS START TIME | 16:48:06.166396 |
| SESSION END TIME | 16:48:08.236911 |
| TOTAL NUMBER OF PACKETS | 604 |
| TOTAL DATA QUANTITY | 819202 BYTES |
| MAXIMUM SEGMENT SIZE | 1460 BYTES |
| AVERAGE CONGESTION WINDOW SIZE | 8 PACKETS |
| ROUND TRIP TIME | 12msec |

24

| | |
|---|---|
| NAME OF SESSION | (A, B) |
| ADDRESS OF TRANSMITTING-SIDE COMMUNICATIONS DEVICE | 13.204.301.562 |
| ADDRESS OF RECEIVING-SIDE COMMUNICATIONS DEVICE | 20.213.223.442 |
| SESSIONS START TIME | 16:48:06.166396 |
| SESSION END TIME | 16:48:08.236911 |
| TOTAL NUMBER OF PACKETS | 604 |
| TOTAL DATA QUANTITY | 819202 BYTES |
| MAXIMUM SEGMENT SIZE | 1460 BYTES |
| ROUND TRIP TIME | 12msec |
| PACKET DISCARD RATE | 0.19 |
| PACKET DISCARD EVENT RATE | 0.08 |

APPARATUS FOR AND METHOD OF MEASURING COMMUNICATION PERFORMANCE

BACKGROUND OF THE INVENTION

1. Field of Invention

The present invention relates generally to a communications network system using an TCP (Transmission Control Protocol) and a UDP (User Datagram Protocol) as communications protocols, and more particularly to an apparatus for and a method of measuring performance in TCP communications and UDP communications.

2. Description of the Related Art

The TCP and the UDP are classified as protocols of a fourth layer (a transport layer) on an IP (Internet Protocol: network layer) of a third layer based on the OSI Reference model. What is characteristic of the TCP lies in carrying out a data transmission (transfer) with a reliability, i.e., controlling the data transmission in a normal state by holding the reliability on a communications path throughout the communications from a start to an end thereof, and detecting and recovering an error when it occurs. Therefore, according to the TCP, full duplex/bidirectional stream services are provided to clients of a host layer by setting a connection-oriented virtual communications path.

The term "connection-oriented" given herein may be conceived as a mode for transferring the data via the communications path after establishing the connection, and implies monitoring a data transmission/receipt during the communications. Further, the "stream service" is intended to transmit a large quantity of data directly to a receiving side on a byte-basis, wherein the data are conceived not as a cluster (fixed length) of blocks and packets but as a bit string.

For keeping the reliability in the communications network system by performing the connection-oriented data transfer in the stream services, it is necessary and indispensable to measure performance in the TCP communications. The performance in the TCP communications might largely differ depending upon processing capabilities of transmitting- and receiving-side communications devices, a processing capability of a router on the communications path (route), and a line capacity.

Further, the UDP communications may be conceived as being of a connection less type in contrast with the TCP communications in which the connection-oriented data communications are carried out, and the UDP itself does not control a transfer speed. However, the performance in the UDP communications, as in the TCP communications, might largely differ depending on the elements described above, and it is also necessary and indispensable for the communications network system to measure the performance in the UDP communications.

For measuring the performance in the TCP communications and in the UDP communications, there has hitherto been taken a technique and method of measuring an actual transfer speed by transmitting a multiplicity of measurement-oriented packets with an execution of simulation programs simulating the TCP and UDP communications.

According to this technique and method, however, the multiplicity of measurement-oriented packets are consecutively transmitted to the network in order to enhance a measurement accuracy, and it is therefore inevitable that the network is burdened with an overload.

SUMMARY OF THE INVENTION

Accordingly, it is a first object of the present invention to provide an apparatus and a method which are capable of measuring performance in TCP communications without transmitting special packets such as measurement-oriented packets, i.e., without applying an overload onto a network.

It is a second object of the present invention to provide an apparatus and a method which are capable of measuring (more precisely, estimating) the performance in the TCP communications by transmitting and receiving, though some special packets are utilized as measurement-oriented packets, a small number of the measurement-oriented packets at an interval of a fixed time, viz., with no overload on the network.

It is a third object of the present invention to provide an apparatus and a method which are capable of measuring (estimating) the performance in the TCP communications and in the UDP communications by transmitting and receiving, though some special packets are utilized as measurement-oriented packets, a small number of the measurement-oriented packets at a variable interval of a fixed time and observing an increment and a decrement in round trip time, viz., with no overload on the network.

To accomplish the first object given above, according to a first aspect of the present invention, a method of measuring communications performance, comprises a step of obtaining, as performance indexes, both of a round trip time and a maximum segment size, and any one of an average congestion window size, a packet discard rate and a packet discard event rate on the basis of a variable length packet in TCP communications through which the packets are transmitted and received based on a TCP defined as a protocol of a transport layer of the OSI Reference model, and a step of obtaining an effective bandwith representing performance in the TCP communications by calculating values of these performance indexes.

According to a second aspect of the present invention, an apparatus for measuring communications performance, comprises a packet monitoring unit for monitoring a variable length packet in TCP communications through which the packets are transmitted and receive based on a TCP defined as a protocol of a transport layer of the OSI Reference model, and obtaining log information containing address information of a transmitting-side communications device and a receiving-side communications device, a packet category and a packet size from the packets;, a performance index detecting unit for obtaining, as performance indexes, both of a round trip time and a maximum segment size, and any one of an average congestion window size, a packet discard rate and a packet discard event rate on the basis of the log information, and a performance calculating unit for obtaining an effective bandwidth representing performance in the TCP communications by calculating values of these performance indexes.

According to a third aspect of the present invention, an apparatus for measuring communications performance, comprises a packet monitoring unit for monitoring a variable length packet in TCP communications through which the packets are transmitted and received based on a TCP defined as a protocol of a transport layer of the OSI Reference model, and obtaining, per session, log information containing address information of a transmitting-side communications device and a receiving-side communications device, a packet category and a packet size from the packets, a session managing unit for managing a flow of the packets per session, a performance index detecting unit for obtaining, as performance indexes, a round trip time, a maximum segment sized and an average congestion window size on the basis of the log information, a storing unit for recording values of the performance indexes detected by the performance index detecting unit per session designated by the session managing unit, and a performance calculating unit for obtaining an effective bandwidth representing performance in the TCP communications by calculating the values of these performance indexes which are recorded in the storing unit.

To accomplish the second object described above, according to a fourth aspect of the present invention, a method of measuring communications performance, comprises a step of obtaining an effective bandwidth representing performance in TCP communications, wherein an average value or an intermediate value of round trip times obtained based on a round trip time measured by transmitting and receiving a small under number of measurement-oriented packets at an interval of a fixed time, a maximum segment size obtained based on a packet size of the measurement-oriented packets transmitted and received, and a maximum congestion window size estimated from a time change in the round trip time, are used as performance indexes.

According to a fifth aspect of the present invention, an apparatus for measuring communications performance, comprises a measuring unit for measuring respectively a maximum segment size and a round trip time by transmitting and receiving a small number of measurement-oriented packets at an interval of a fixed time, a performance index detecting unit for obtaining an average value or an intermediate value of the round trip times, and estimating the maximum segment size from a time change in the round trip time; and a performance calculating unit for obtaining an effective bandwidth representing performance in the TCP communications on the basis of the maximum segment size, the average value or the intermediate value of the round trip times, and the maximum congestion window size.

To accomplish the third object described above, according to a sixth aspect of the present invention, a method of measuring communications performance, comprises a step of measuring a round trip time by transmitting and receiving a small number of measurement-oriented packets at a variable interval of a fixed time, a step of determining a rate at which the round trip time of the measurement-oriented packet is longer than the round trip time of the measurement-oriented packet just anterior thereto, and a step of checking whether or not the rate is over a predetermined threshold value, then, if over, judging that a transfer speed of the measurement-oriented packet exceeds an available bandwidth of a network route, and thereby judging that the available bandwidth of the network route in any one of a case where the communications are performed by use of a protocol of a transport layer of the OSI Reference model in which the protocol itself such as a UDP does not control the transfer speed and a case where the communications are performance by use of a TCP defined as a protocol of the transport layer of the OSI Reference model, exceeds a certain predetermined value.

According to a seventh aspect of the present invention, an apparatus for measuring communications performance, comprises a measuring unit for measuring a round trip time by transmitting and receiving a small number of measurement-oriented packets at a variable interval of a fixed time, a rate determining unit for determining a rate at which the round trip time of the measurement-oriented packet is longer than the round trip time of the measurement-oriented packet just anterior thereto, and a performance determining unit for checking whether or not the rate is over a predetermined threshold value, then, if over, judging that a transfer speed of the measurement-oriented packet exceeds an available bandwidth of a network route, and thereby judging that the available bandwidth of the network route in a case where the communications are performed by use of a protocol of a transport layer of the OSI Reference model in which the protocol itself such as a UDP does not control the transfer speed, exceeds a certain predetermined value.

According to an eighth aspect of the present invention, an apparatus for measuring communications performance, comprises a measuring unit for measuring a round trip time by transmitting and receiving a small number of measurement-oriented packets at a variable interval of a fixed time, a rate determining unit for determining a rate at which the round trip time of the measurement-oriented packet is longer than the round trip time of the measurement-oriented packet just anterior thereto, and a performance determining unit for checking whether or not the rate is over a predetermined threshold value, then, if over, judging that a transfer speed of the measurement-oriented packet exceeds an available bandwidth of a network route, and thereby judging that the available bandwidth of the network route in a case where the communications are performed by use of a TCP defined as a protocol of the transport layer of the OSI Reference model, exceeds a certain predetermined value.

According to the present invention, an effective bandwidth (a transfer speed) is obtained, wherein both of the round trip time and the maximum segment size, and any one of the average congestion window side, the packet discard rate and the packet discard event rate which are obtained based on the variable length packet in which the TCP communications through which the packets are transmitted and received based on the TCP defined as a protocol of the transport layer of the OSI Reference model, are used as the performance indexes. It is therefore feasible to measure the performance in the TCP communications on the communications route of the network without transmitting a multiplicity of special measurement-oriented packets to the network with no load applied on the network.

Further, according to the present invention, the maximum congestion window size in the case of performing the TCP communications can be estimated from a time change in the round trip time by transmitting and receiving the small number of measurement-oriented packets at the variable interval of the fixed time. An estimated value of the effective bandwidth in the case of performing the TCP communications can be obtained from the average or intermediate value of the round trip times, the maximum segment size and the estimated maximum congestion window size. This makes it possible to estimate the performance in the TCP communications without transmitting the multiplicity of the measurement-oriented packets with no load applied on the network.

Moreover, according to the present invention, an estimated value of the available bandwidth (the effective bandwidth) can be obtained from the rate at which the round trip time increases by transmitting and receiving the small number of measurement-oriented packets at the variable interval of the fixed time. It is therefore feasible to estimate the network performance (the TCP and UDP communications performance) in a short period of time without transmitting the multiplicity of the measurement-oriented packets with no load applied on the network.

BRIEF DESCRIPTION OF THE DRAWINGS

These objects and advantages of this invention will become more apparent and more readily appreciated from the following detailed description of the presently preferred exemplary embodiments, taken in conjunction with the accompanying drawings of which:

FIG. 3 is a diagram showing log information of a TCP packet;

DETAILED DESCRIPTION OF THE PREFERRED EMBODIMENTS (First Embodiment)

Figure 1:
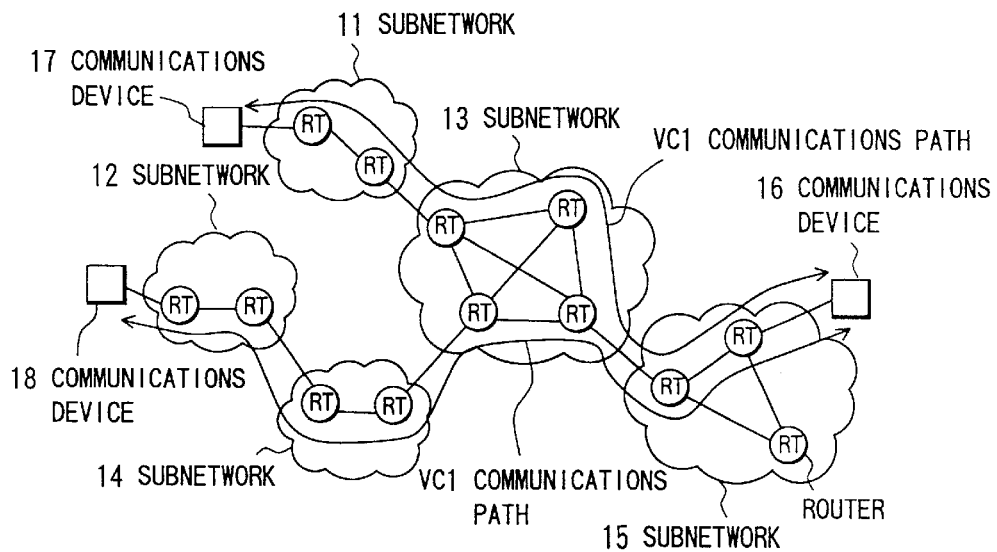
FIG. 1 is a block diagram showing a communications network system in a first embodiment of the present invention.

FIG. 1 illustrates a first embodiment of the present invention, wherein a communications network system 1 includes a plurality of subnetworks 11 through 15. These subnetworks structure a computer network such as UNIX, and a broadband PSN (Packet Switching Network). Each of the subnetworks 11 through 15 has routers RT for connecting the subnetworks to each other at a network layer level in the OSI Reference Model. Exemplified herein is an architecture in which the subnetworks 15, 11 and 12 accommodate communications devices 16, 17 and 18. These communications devices are classified as communication terminals and computers each having an IP (Internet Protocol) address. The communications device 17 transmits and receives the data to and from the communications device 17 on a communication path VC1 via the subnetworks 15, 13 and 11 (which is called TCP communications). Further, the communications device 16 transmits and receives the data to and from the communications device 18 (the TCP communications) on a communications path VC2 via the subnetworks 15, 13, 14 and 12.

Figure 2:
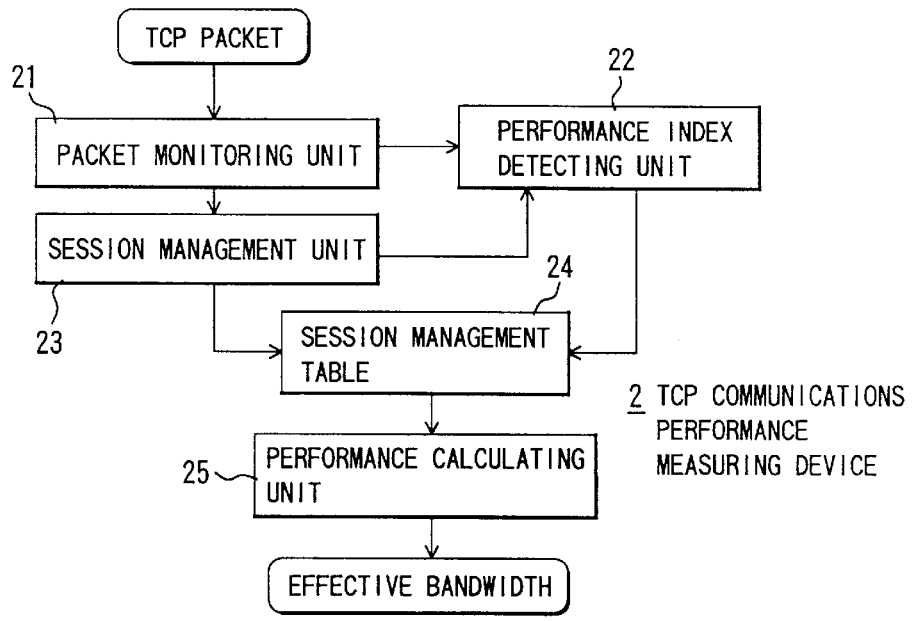
FIG. 2 is a block diagram illustrating a configuration of a TCP communications performance measuring device disposed in the communications network system shown in FIG. 1.

A TCP communications performance measuring device 2, shown in FIG. 2, for measuring performance of the TCP communications, is disposed in the communications network system 1 taking this architecture. As for the disposition of this device 2, any one of the communications devices 16, 17 and 18 may be selected, and it may be a predetermined option whether the measuring device 2 and the selected communications device are configured within the same box body or separately configured. In the TCP communications performance measuring device 2, a packet monitoring unit 21 monitors a TCP packet (a variable length packet of a bit stream) transmitted and received by the communications device in a position of the disposition, and takes in log information which will be explained in details. The take-in of the log information of the TCP packet may involve the use of existing software such as "tcpdump" (Van Jacobson, Craig Leres and Steven McCanne (Lawrence Berkely National Laboratory), tcpdump-dump traffic on a network, URL: ftp://ftp.ee.lbl.gov/tcpdu mp.tar.Z) on UNIX. A performance index detecting unity 22 obtains information on the performance of the TCP communications on the basis of the log information given from the packet monitoring unit 21. A session management unit 23 detects, based on the log information contained in the TCP packet, addresses of a pair of a transmitting-side communications device and a receiving-side communications device which are performing the communications, and records the addresses per pair in a session management table 24 which will be mentioned later on. To be specific, the session management unit 23 manages per session (the addresses of the pair of communications devices) a flow of the TCP packets. The session management table 24 is defined as a database for recording a value of performance index (which will hereinafter be explained) of the TCP communications per session. Further, a performance calculating unit 25 calculates the performance of the TCP communications on the communications path on the network, from the performance index value recorded per session in the session management table 24.

The log information of the TCP packet taken in by the packet monitoring unit 21 of the TCP communications performance measuring device 2, as shown in FIG. 3, contains a transmitting/receiving time, addresses of the transmitting- and receiving-side communications devices, a packet category and a packet size. Further, the performance index detecting unit 22 of the measuring device 2 detects the performance index value from the log information with respect to a session designated in the session management table 24 by the session management unit 23, and stores the value in the session management table 24. The performance index includes a round trip time, a maximum segment size, an average congestion window size, a packet discard rate and a packet discard event rate.

Figure 4:
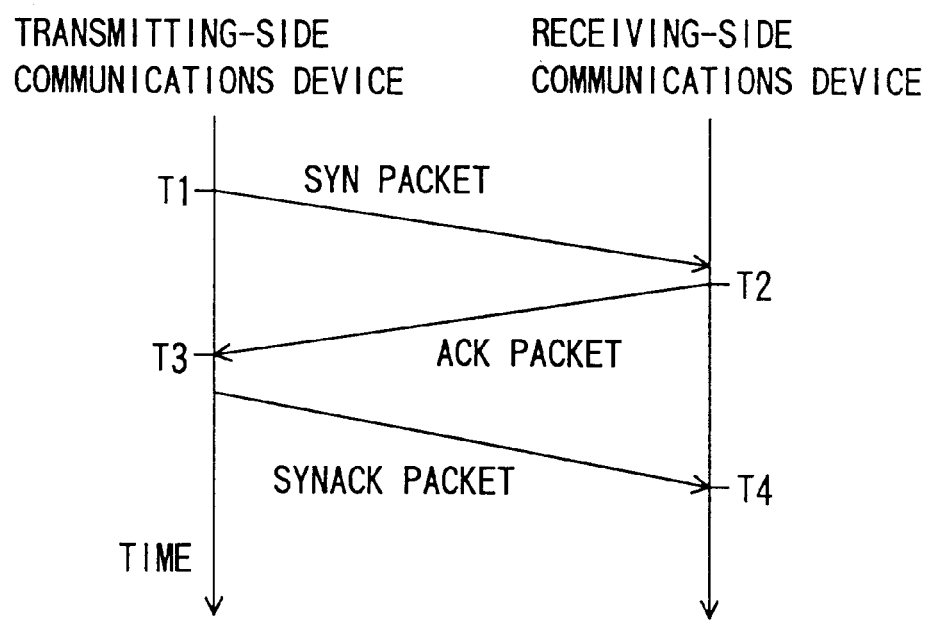
FIG. 4 is a sequence chart showing how the packets are transmitted and received when establishing a TCP connection.

Next, a method of detecting each performance index will be described. The round trip time is detected by seeking out a packet transfer/receipt, which is known as handshaking for establishing a TCP connection, from the log information on the designated session. FIG. 4 shows one example of the handshaking for establishing the TCP connection. The transmitting-side communications device transmits a SYN (synchronous) packet to the receiving-side communications device. The receiving-side communications device transmits an ACK (acknowledgement) packet back to the transmitting-side communications device. Further, the transmitting-side communications device, upon receiving the ACK packet, transmits a SYNACK (acknowledgement response) packet back to the receiving-side communications device. The TCP connection between the transmitting- and receiving-side communications devices is thereby established.

The round trip time can be measured in the position of either the transmitting-side communications device or the receiving-side communications device. When measured in the position of the transmitting-side communications device, viz., in a case where the measuring device 2 is disposed therein, a round trip time RTT is calculated from a SYN packet transmitting time T1 and an ACK packet receiving time T3 by the following formula (1):

$$RTT(\text{msec}) = T3 - T1 \quad (1)$$

Further, in the position of the receiving side communications device, the round trip time RTT is calculated from a SYN packet transmitting time T2 and an ACK packet receiving time T4 by the following formula (2):

$$RTT(\text{msec}) = T4 - T2 \quad (2)$$

The maximum segment size (unit: byte) is detected on a way which follows. In the TCP communications, the packet size is determined based on a maximum transmission unit (MTU) of the router on the communication path. If there are plurality of relay routers on the communications path, a minimum value of the maximum transmission unit becomes the maximum segment size in the TCP communications. In the TCP communications, the MTU of the router on the communications path is detected, and the maximum segment size is automatically adjusted. For obtaining the maximum size of a certain session, the packet size in the TCP communications may be extracted out of the pieces of log information collected by the packet monitoring unit 21.

Figure 5:
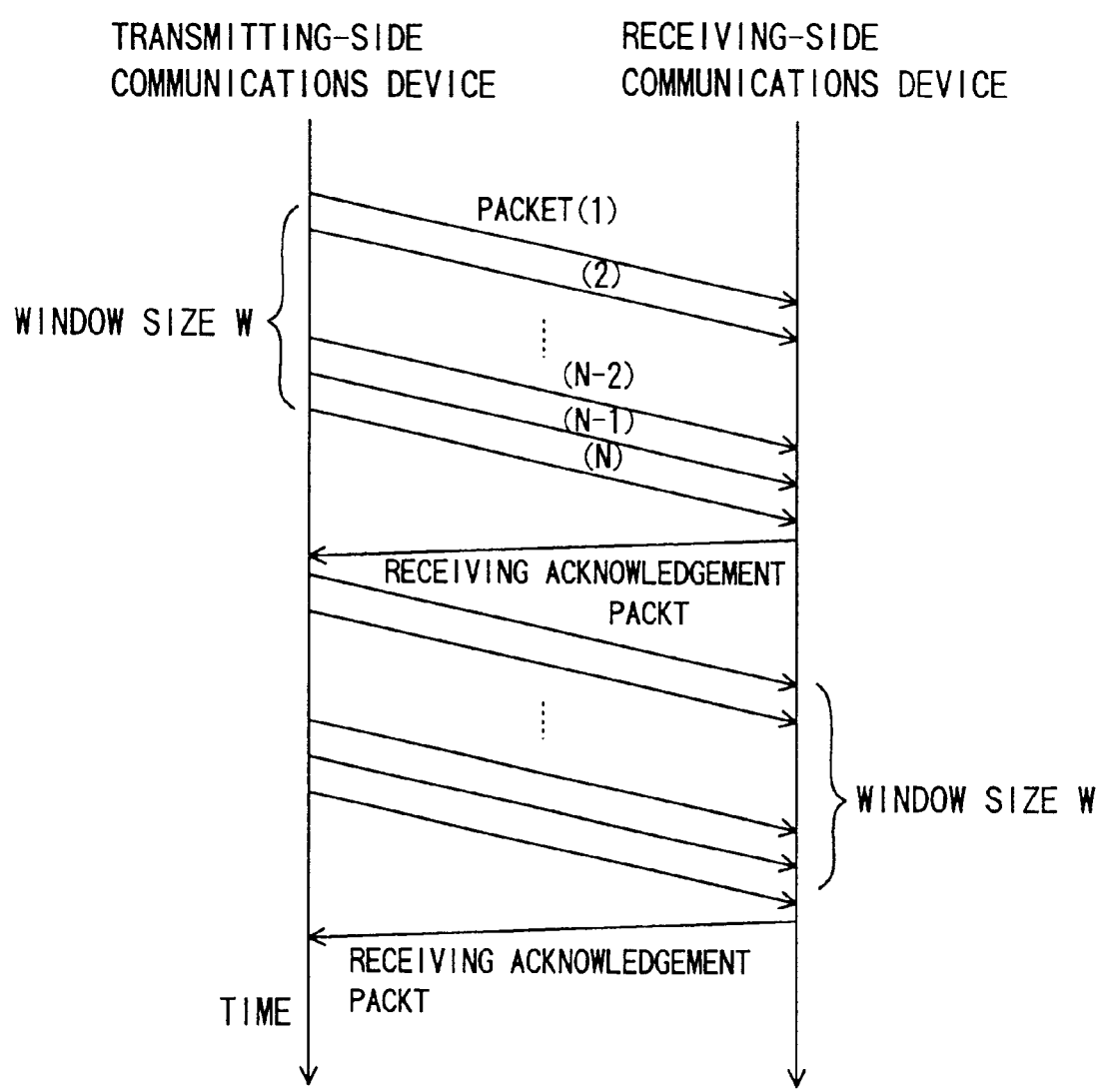
FIG. 5 is an explanatory sequence chart showing a sliding window system.

Moreover, the average congestion window size (unit: packet) is detected as follows. In the TCP communications, the packets are transmitted while restricting an output by a sliding window system. More specifically, the number of packets transmitted at one time on a window size basis is restricted, and, after confirming from an acknowledgement packet received from the receiving-side communications device that the packets for the window size have been transferred, the packets for a next window size are transmitted (see FIG. 5).

It may suffice for obtaining the window size to check the number of the packets transmitted within one single window cycle from the log information of the packets transmitted or received. The window size might, however, change with a passage of time as the TCP communications proceed. According to the TCP, the window size is adjusted by combining two algorithms for a slow start and for a congestion avoidance. That is, immediately after establishing the TCP connection, with the slow start done, the window size is increased from a value "1" in a way of an exponential function. When the subnetworks eventually come to a congestion, however, the packets are discarded with the result that the receiving acknowledgement packet does not arrive at.

In the transmitting-side communications device, if the receiving acknowledgement packet does not arrive at within a predetermined period of time, it is judged that the subnetwork encounters the congestion, and the widow size is adjusted. The adjustment of the window size is made by the congestion avoidance algorithm. That is, when the packet discard occurs (when the receiving acknowledgement packet does not arrive at within the predetermined time), the window size is reduced down to the half, and the window size is increased one by one till the packet discard occurs again. When the packet discard occurs, the window size is again reduced down to the half, and the same process is repeated.

Figure 6:
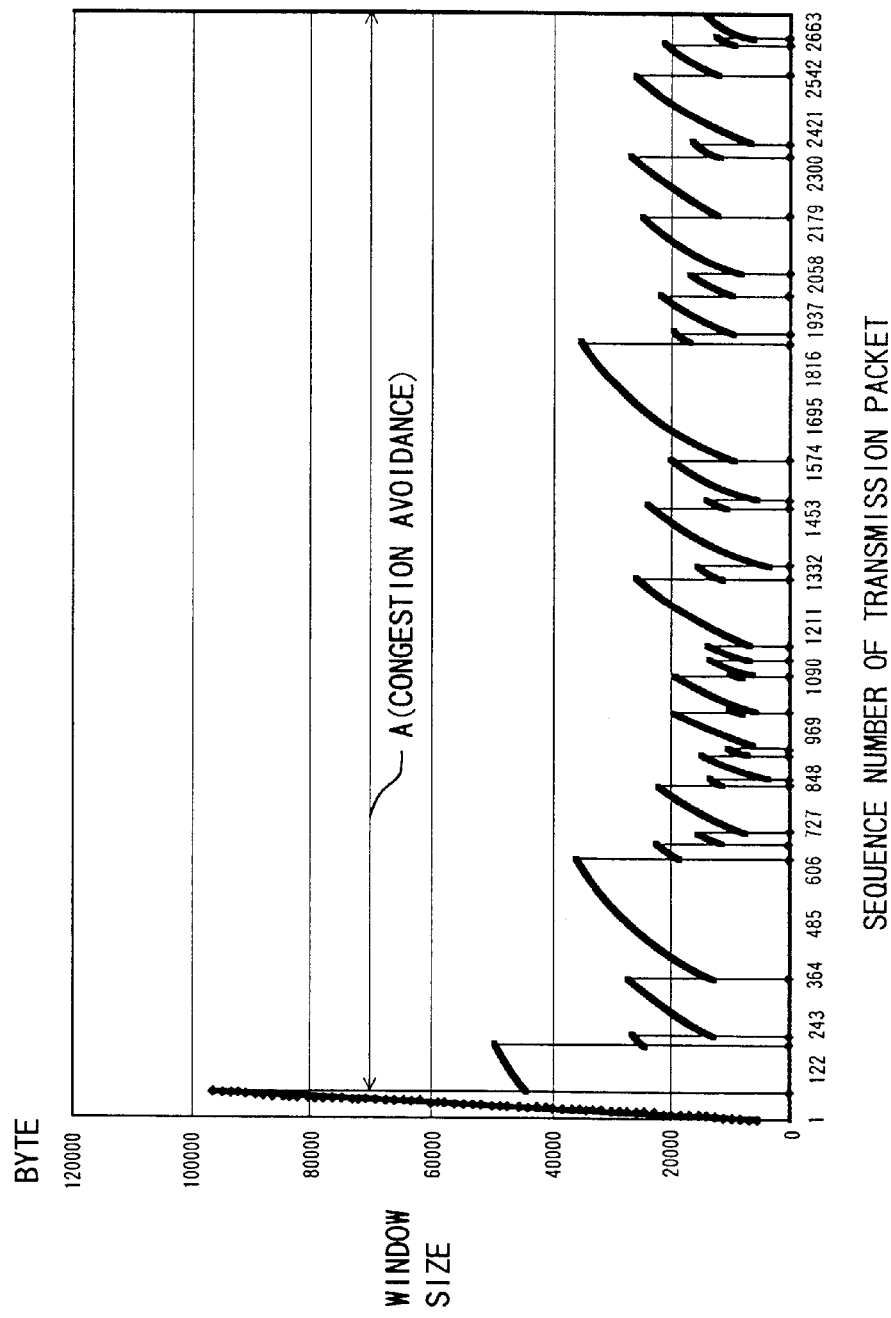
FIG. 6 is a diagram showing one example of a time change in a window size.

FIG. 6 shows one example of a time change in the window size. Referring to FIG. 6, the window size indicated by the axis of ordinates is shown with unit bytes by multiplying a maximum segment size. The performance index detecting unit 22 obtains as a value of the window size an average vale of the window sizes while in an execution of the congestion avoidance algorithm (indicated by the symbol A in FIG. 6).

Figures 7, 8:
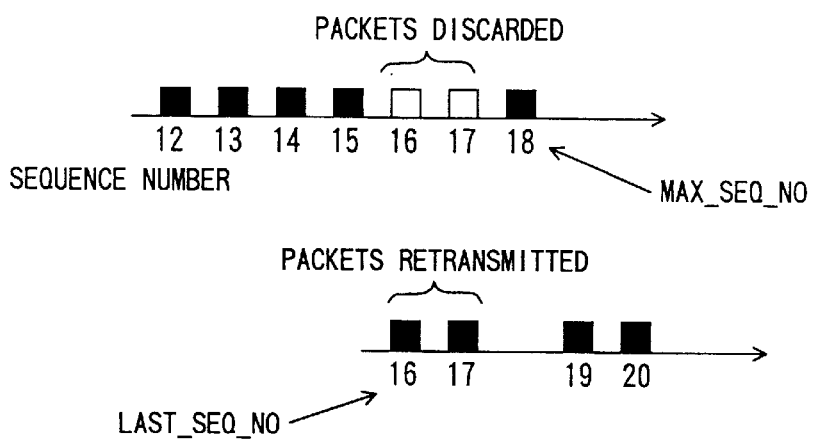
FIG. 7 is a diagram showing one example of performance indexes stored in a session management table of the TCP communications performance measuring device shown in FIG. 2.
FIG. 8 is an explanatory diagram showing a sequence number of the TCP packet, and a packet discard.

The round trip time, the maximum segment size of and the average congestion window size each defined as the performance index can be extracted from the log information by use of the existing software such as "tcptrace" (Shawn Ostermann (Ohio University), tcptract-a TCP dump file analysis tool, URL:http//jarok.cs.ohiou.edu/software/tcptract.html) on UNIX. FIG. 7 illustrates one example where the session management table 24 is stored with respective value of the round trip time, the maximum segment size and the average congestion window size which have been obtained as the performance indexes in the way described above.

The performance calculating unit 25 calculates an effective bandwidth (a transfer speed) representing the TCP communications performance on the basis of those performance indexes. Herein, assuming that BW (byte/sec) be the effective bandwidth, RTT (sec) be the round trip time, MSS (bytes) is the maximum segment size and <W> (packet) be the average congestion window size, the performance calculating unit 25 obtains the effective bandwidth BW by the formula (3), and outputs BW as a performance value in the TCP communications.

$$BW = <W> \times MSS/RTT \quad (3)$$

What has been discussed so far is the case the performance calculating unit 25 calculates the effective bandwidth representing the TCP communications performance on the basis of the round trip time, the maximum segment size and the average congestion window size which have been detected as the performance indexes by the performance index detecting unit 22. The effective bandwidth width can be also, however, obtained by a substitute method which will be explained next.

That is to say, the performance index detecting unit 22 detects a packet discard rate or a packet discard event rate instead of the average congestion window size, and set it as a performance index for calculating the effective bandwidth. When the packets are transmitted through the TCP communications, sequence numbers are imparted to the packets in order, and recorded in headers of the packets. When tracing the sequence numbers of the TCP packets per session, if the sequence number increases in order, it can be recognized that the packets are transmitted or received without being discarded. If the sequence number is reversed, the packet with this reversed number, and hence it can be known that the packet has been retransmitted. Accordingly, as shown in FIG. 8, an occurrence of the reverse of the sequence number is counted as a packet discard event, and the number of the retransmitted packets after the sequence number has been reversed, is counted as a packet discard.

Figure 9:
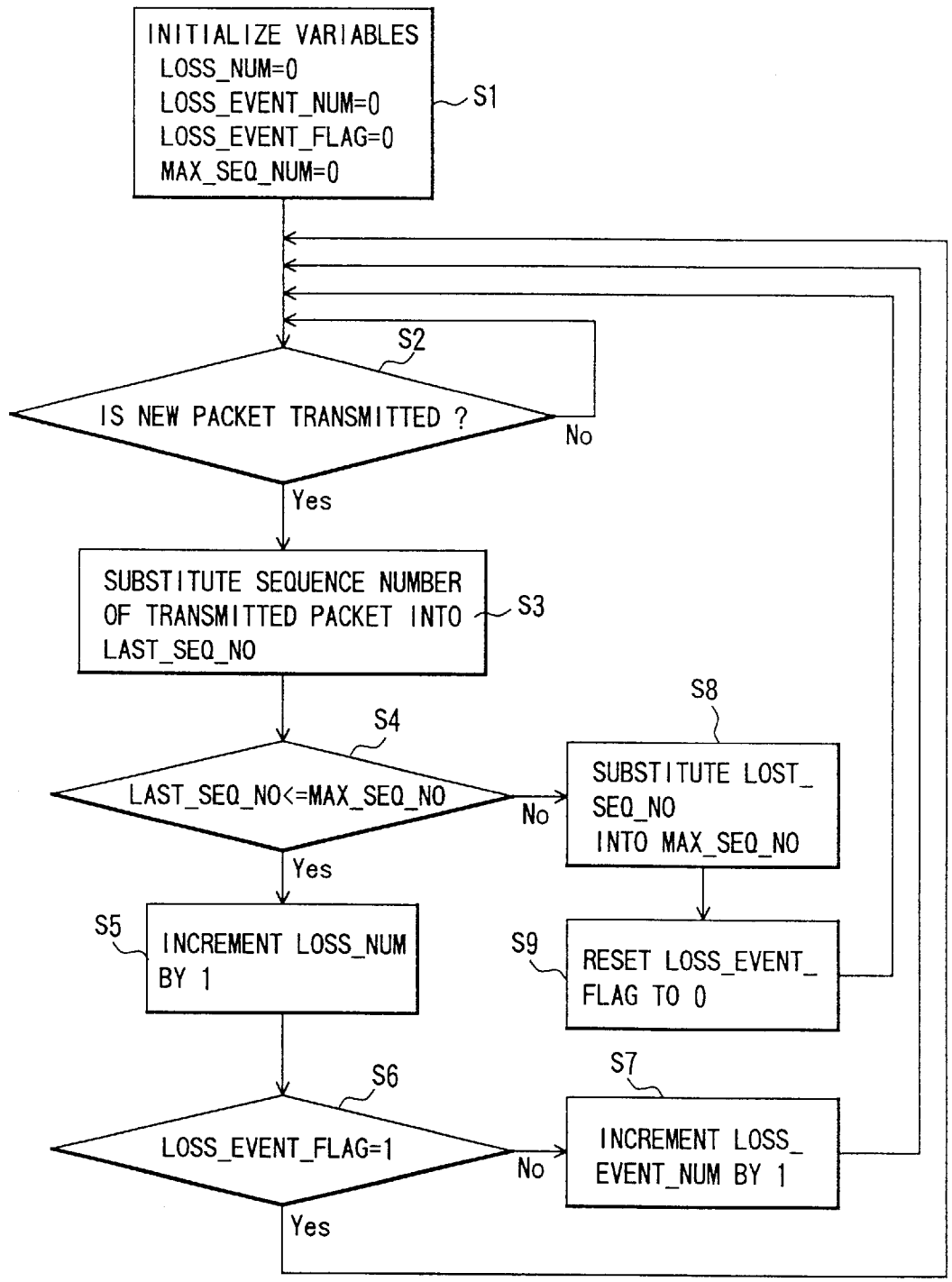
FIG. 9 is a flowchart showing one example of a method of counting the number of packets discarded and the number of packet discard events.

A method of counting the number of the packet discards and the number of the packet discard events will be explained with reference to FIG. 9. The performance index detecting unit 22 has a memory for storing, as variables, respective values of LOSS-NUM (a packet discard counter), LOSS-EVENT-NUM (a packet discard event counter), LOSS-EVENT-FLAG (a packet discard event hysteresis flag), MAX-SEQ-NO (a maximum sequence number) and LAST-SEQ-NO (a latest transmission packet sequence number).

The performance index detecting unit 22 initializes to "0" the respective values of LOSS-NU, LOSS-EVENT-NUM, LOSS-EVENT-FLAG, and MAX-SEQ-NO. In step S2, it is detected from the log information of the packet whether or not a new packet is transmitted. When the new packet has been transmitted, the processing proceeds to step S3. Whereas if not, the process in step S2 is repeated. In step S3, a sequence number of the new packet transmitted is detected from the log information, and is substituted into LAS-SEQ-NO. The performance index detecting unit 22 checks in step S4 an establishment of such a condition that LAS-SEQ-NO is under MAX-SEQ-NO. The establishment of the condition in step S4 implies that the packet has been discarded. When the condition is established in step S4, the processing proceeds to step S5, wherein LOSS-NUM is incremented by "1". The processing advances to step S6. It is checked in step S6 whether or not LOSS-EVENT-FLAG is "1". If LOSS-EVENT-FLAG is "1", the packet discard events are already counted, and hence the processing goes back to step S2. If LOSS-EVENT-FLAG is "0", the packet discard events are not yet counted, and therefore the processing advances to step S7, in which LOSS-EVENT-NUM is incremented by "1".

If the condition is not established in step S4, the sequence number is not reversed, and the packet discard does not occur. At this time, the processing proceeds to step S8, in which a value of LAST-SEQ-NO is substituted into MAX-SEQ-NO. Next, LOSS-EVENT-FLAG is reset to "0" in step S9. The processing returns to step S2. Just when the session is finished, a value of LOSS-NUM is given as the number of the packets discarded, and a value of LOSS-EVENT-NUM is given as the number of packet discard events. The performance index detecting unit 22 obtains a packet discard rate and a packet discard event rate by using these values in the way which follows.

A packet discard rate p, with the performance index detecting unit 22 detecting the number of packets (the number of packets discarded) of which the receipts are not confirmed by the receiving acknowledgement packet and a total number of packets transmitted or received by referring to the packet log information per session, is calculated in the formula (4):

$$p=\text{Number-of-discarded-packets/Total-number-of-packets} \quad (4)$$

According to the congestion avoidance algorithm of the TCP, when the packet is discarded in the window size, even if a plurality of packets might be discarded, this packet discard is conceived as one single congestion signal, and the window size is adjusted (reduced down to the half). Accordingly, the occurrence that the sequence number is reversed is conceived as one single packet discard event, and a packet discard event rate q is calculated by the formula (5). Note that an accuracy of estimation is more enhanced by obtaining the effective bandwidth using this event rate q.

$$q=\text{Number-of-packet-discard-events/Total-number-of-packets} \quad (5)$$

Figures 10, 11:
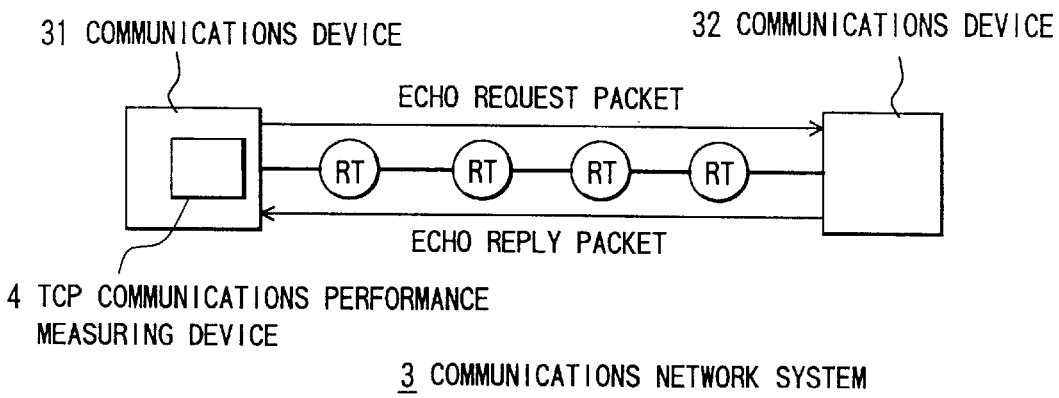
FIG. 10 is a diagram showing another example of the performance indexes stored in the session management table of the TCP communications performance measuring device shown in FIG. 2.
FIG. 11 is a block diagram showing the communications network system in second and third embodiments of the present invention.

FIG. 10 shows one example in which the packet discard rate p and the packet discard event rate q which are this obtained as the performance indexes, are stored per session in the session management table 24 together with other performance indexes such as the round trip time RTT and the maximum segment size MSS.

The performance calculating unit 25 calculates the effective bandwidth BW by the formula (6) or (7), based on the performance indexes obtained above, and outputs BW.

$$BW = C \times MSS/RTT/\sqrt{p} \quad (6)$$

$$BW = C \times MSS/RTT/\sqrt{q} \quad (7)$$

where C is the constant as well as being a parameter for making a mixture adjustment with a range of 1±0.3 depending on an implementation of the TCP in use, i.e., a difference in the congestion avoidance algorithm and a difference in the way of discarding the packets in the router in the network.

The TCP communications performance measuring device described above may be disposed in the position of any one of the communications devices in the communications network system illustrated in FIG. 1, however, if these communications devices are assumed to be servers and clients, the measured result can be utilized in the following way, depending on the disposition thereof. To be specific, in a case where the TCP communications performance measuring device is disposed on the side of the client, if the network has a plurality of servers for providing the same service, a performance of the service received by the client might differ depending on the server selected by the client. In such a case, the client is capable of measuring the TCP communications performance and selecting the server exhibiting the best service performance.

Further, if the TCP communications performance measuring device is disposed on the side of the server, when the server provides the client with the service, it might be desired that the performance of the service is adjusted using a processing capability of the client and the performance on the path in the network. For example, in the case of providing the client with video signals and voice signals, a data quantity might be controlled in accordance with the performances of the client and of the network. In such a case, the server is capable of providing the service having a quality suitable for the client by measuring the TCP communications performance.

(Second Embodiment)

FIG. 11 illustrates a communications network system in a second embodiment of the present invention. An architecture of this communications network system 3 is shown as what schematizes the principal elements in the architecture of the communications network system 1 in the first embodiment illustrated in FIG. 1. Accordingly, there are shown two communications devices 31 and 32 communicating with each other, and four routers RT disposed on the communicating path (a route) between these communications devices 31 and 32. A TCP communications performance measuring device 4 is provided in any one of the communications devices. The communications device provided with this measuring device 4 is called a transmitting-side communications device, while the other communications device is referred to as a receiving-side communications device. The TCP communications performance measuring device 4 disposed in the transmitting-side communications device 31 transmits a measurement-oriented packet as an echo request packet to the receiving-side communications device 32, and receives an echo reply packet transmitted back by the receiving-side communications device 32, thereby measuring (estimating) a TCP communications performance between these two communications devices.

Figure 12:
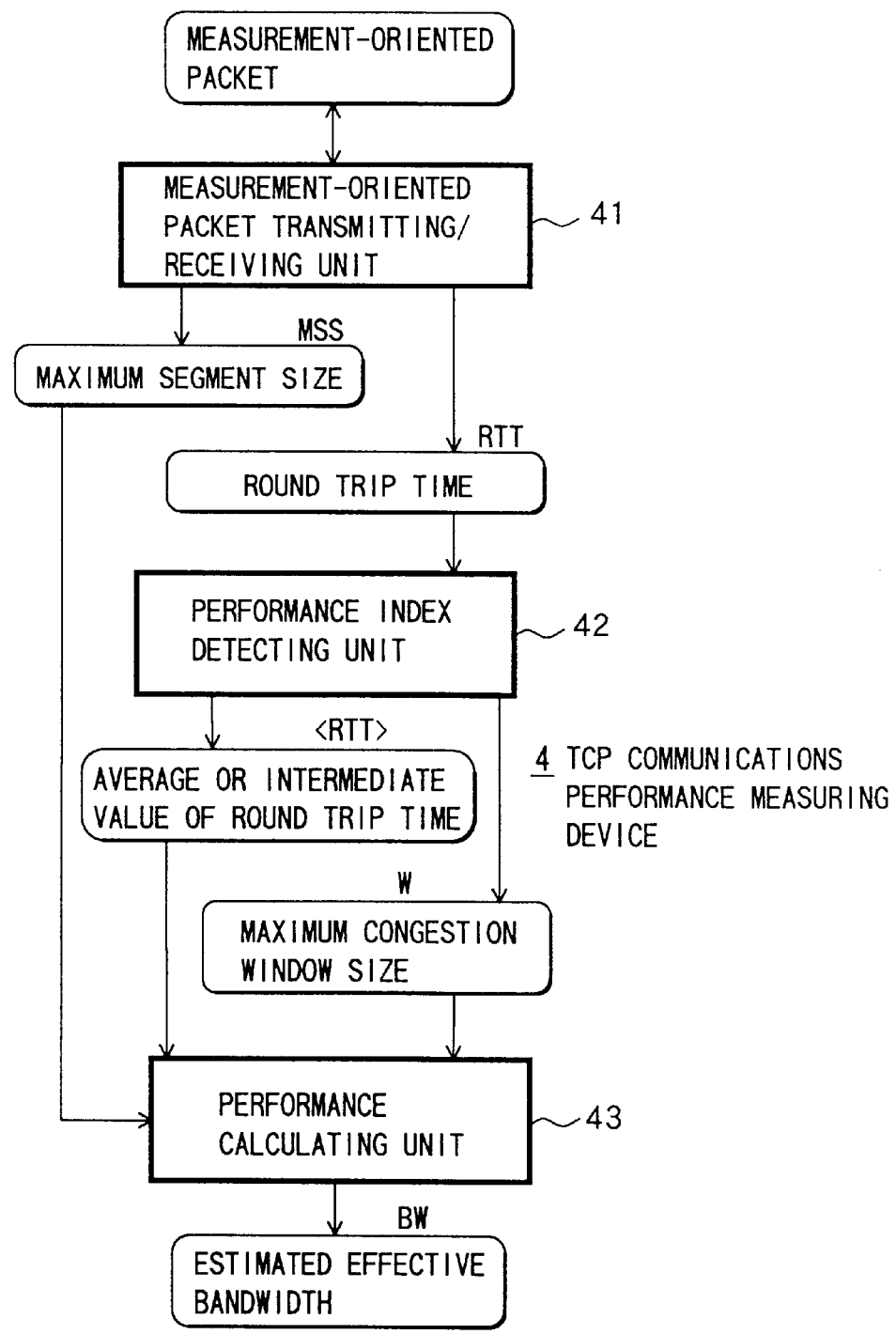
FIG. 12 is a block diagram showing a configuration of the TCP communications performance measuring device in the second embodiment.

In the TCP communications performance measuring device 4 of which a detailed configuration is illustrated in FIG. 12, a measurement-oriented packet transmitting/receiving unit 41 transmits the measurement-oriented packet as the echo request packet to the receiving-side communications device, and receives the echo reply packet transmitted back by the receiving-side communications device, thereby measuring a maximum segment size (MSS) and a round trip time (RTT). A performance index detecting unit 42 obtains an average value or an intermediate value (<RTT>) of the round trip times, and estimates a maximum congestion window size (W) from a time change in the round trip time. Further, a performance calculating unit 43 calculates an effective bandwidth (estimated effective bandwidth) from the average value of the intermediate value of the round trip times, and from a value of the maximum congestion window size.

The measurement-oriented packet transmitting/receiving unit 41 measures the maximum segment size in the way which follows. The maximum segment size is defined as a packet size depending upon a maximum value (Maximum Transmission Unit: MTU) of the packet size with which the router on the communications path is capable of transmitting the packet. If there are a plurality of routers on the communications path, a minimum value of MTU of each router becomes the maximum segment size. The measurement-oriented packet transmitting/receiving unit 41 transmits and receives the packet while changing the size of the measurement-oriented packet, thus measuring the maximum segment size, and outputs a value of this size. The measurement-oriented packet transmitting/receiving unit 41 transmits the measurement-oriented packet while changing the size of the measurement-oriented packet from 128 bytes up to 32,768 bytes in order to detect the maximum segment size. If the packet size is larger than the MTU (maximum transmission unit) of the route, the router, which could not transfer the packet, sends back a specified message (TooBig message), and hence the maximum packet size of the packets about which any routers on the route do not send back the TooBig message, is set as the maximum segment size.

Further, the measurement-oriented packet transmitting/receiving unit 41 measures the round trip time at an interval of a fixed time in the way which follows. The measurement-oriented packet transmitting/receiving unit 41 transmits the measurement-oriented packet as an echo request packet to the receiving-side communications device, and receives the echo reply packet transmitted back by the receiving-side communications device, thereby measuring the round trip time between the two communications devices. This measurement may involve the use of "ping" (ping-send ICMP ECHO-REQUEST packets to network hosts, Software is available on most UNIX-based operating systems) normally loaded in the operating system such as UNIX and WindowsNT, or "exchoping" (S. Bortzmeyer, echoping-tests are mote host with TCP or UDP, Software is available from URL: ftp://ftp.pasteur.fr/pub/computing/unixnetwork/echoping/) classified as software on UNIX.

The measurement-oriented packet transmitting/receiving unit 41 measures by use of "ping" a time till an ICMP echo request packet is received since the ICMP echo request packet has been transmitted to the receiving-side communications device, and outputs the measured time as a value of the round trip time. In the case of using "echoping", the operation is the same as "ping" except for receiving the echo reply packet by transmitting a TCP or UDP echo request packet as a substituted for the ICMP echo request packet to a TCP or UDP echo part. The measurement-orientation packet transmitting/receiving unit 41 measures the round trip time by use of "echoping" in the same way as "ping", and outputs a value thereof. ICMP given herein is an abbreviation of Internet Control Message Protocol.

The measured values of the round trip time become more approximate to the round trip time in the actual TCP communications in the order of the ICMP packet based measurement, the UDP packet based measurement and the TCP packet based measurement, and the performance of the TCP communications can be more precisely measured. To describe it in much greater details, the ICMP is a protocol of a network layer (IP layer), while the TCP and the UDP are protocols of a transport layer on the IP layer. Furthermore, the TCP is classified as a connection type communications protocol, while the UDP is classified as a connection less type communications protocol. There might occur a difference between the round trip times measured by use of the ICMP, UDP and TCP echo packets due to a difference in nature between the protocols.

The most accurate measurement of the performance of the TCP communications may involve the use of the connection type TCP echo packet, and it is feasible to measure the round trip time most approximate to the actual TCP communications round trip time. What is next to the above is a round trip time measurement using the UDP echo packet in the same transport layer. In the case of the UDP, however, the round trip time is shorter than in the case of TCP because of the connection less type. What exhibits the worst performance is the round trip measurement based on the ICMP echo packet. This is because the ICMP is a protocol operating not on the transport layer but on the IP layer thereunder, wherein there are a less number of protocol processes, and the round trip time is the shortest. There is however, not large difference in terms of the precision. When considering an overhead (a load on the server and the router) burdened on the measurement. It would be rather desirable to utilize the ICMP echo packet with a less processing load because of the overhead becoming larger in the order of the ICMP, the UDP and the TCP.

The measurement-oriented packet transmitting/receiving unit 41 transmits and receives the measurement-oriented packet at the interval of the fixed time by utilizing "ping" or "echoping", the measures the round trip time, and sequentially outputs a result thereof to the performance index detecting unit 42. The performance index detecting unit 42 receives a value of the round trip time measured at the every interval of the fixed time from The measurement-oriented packet transmitting/receiving unit 41, and estimates and outputs the maximum congestion window size when performing the TCP communications. Explained is a method by which the performance index detecting unit 42 estimates the maximum congestion window size. Let RTT(t) be the round trip time at a timing t. An average value or an intermediate value of the round trip time is obtained from a time series of the round trip times, and set as <RTT>. Herein, the intermediate value is a (m/2)th value when m-periods of the round trip times are arranged from the smaller.

There is executed next a process of smoothing the time series of the round trip times for eliminating fluctuations (noises). Let SRTT(t) be the smoothed round trip time at the timing t, and SRTT(t) is obtained by n-segment movement averaging or a smoothing recursion formula. For instance, in the case of 4-segment movement averaging, SRTT(t) is given from values of RTT at timings t-3, t-2, t-1 and t by the formula (8):

$$SRTT(t)=(RTT(t\text{-}3)+RTT(t\text{-}2)+RTT(t\text{-}1)+RTT(t))//4 \quad (8)$$

In the case of the smoothing recursion formula, SRTT(t) is obtained by the formula (9):

$$SRTT(t)=\alpha \times SRTT(t\text{-}1)+(1-\alpha)\times RTT(t) \quad (9)$$

where α is the smoothing coefficient for taking a value from "0" to "1". The smoothing coefficient α is defined as a parameter for smoothing the round trip time by eliminating instantaneous noises of the round trip time. On the occasion of obtaining the smoothed round trip time, the value of the smoothing coefficient α is adjusted based on how much ratio the round trip time smoothed one time before and the present round trip time are evaluated at.

If a technical emphasis is put on the values of the round trip times smoothed in the past, the coefficient α takes a value vicinal to "1". If it is desired that the value of the present round trip time be taken large, the coefficient α takes a value clinical to "0". If an instantaneous fluctuation in the previous round trip time is sharp, the coefficient α is set to a value vicinal to "1". Whereas if not, the coefficient α may be set to a value vicinal to "0". In the case of the smoothing recursion formula in which the value at the present time may suffice, the round trip time can be smoothed with a less number storage areas than based on the movement averaging which requires several values in the past.

Next, a time differential DRTT(t) of the round trip time SRTT smoothed at the timing, is given by the formula (10):

$$DRTT(t)=SRTT(t)-SRTT(t\text{-}1) \quad (10)$$

The smoothing process is executed also on a time series of DRTT thus obtained. Let SDRTT be a value of DRTT smoothed, SDRTT(t) is given by the n-segment movement averaging or the smoothing recursion formula as in the formula (11) or (12). Note that the formula (11) deals with a case where n=4.

$$SDRTT(t)=(DRTT(t\text{-}3)+DRTT(t\text{-}2)+DRTT(t\text{-}1)+DRTT(t))/4 \quad (11)$$

$$SDRTT(t)=\alpha \times SRTT(t\text{-}1)+(1-\alpha)\times RTT(t) \quad (12)$$

There are detected all timings when the value of SDRTT changes from positive to negative by following up in time a change in the value of SDRTT(t), i.e., when SRTT is maximized. It is presumed that the packet discard occurs in the router at this point of time. A time interval L(k)(sec) till a k-th packet discard occurs since a (k-1)th packet discard has occurred, is obtained by the formula (13):

$$L(k)=(\text{Timing when SDRTT becomes from positive to negative at }k\text{-th packet discard})-(\text{Timing when SDRTT becomes from positive to negative at }(k-1)\text{th packet discard}) \quad (13)$$

An average value or an intermediate value of L(k) is obtained and set as <L>. An estimated value W of the maximum congestion window size is obtained by the formula (14) using the average value or the intermediate value <RTT> of the round trip time, and the average value <L> of cycles of the packet discard event:

$$W=2\times <L>/<RTT> \quad (14)$$

The performance index detecting unit 42 outputs the average of intermediate value <RTT> of the round trip times, and the estimated value W of the maximum congestion window size. The performance calculating unit 43 receives the maximum segment size MSS from the measurement-oriented transmitting/receiving unit 41, and also receives the average or intermediate value <RTT> of the round trip times and the estimated value W of the maximum congestion window size from the performance index detecting unit 42. Then, the performance calculating unit 43 obtains the estimated value BW of the effective bandwidth when performing the TCP communications, and output this value BW. The estimated effective bandwidth BW is given by the formula (15):

$$BW=(3/4)\times W \times M_{SS}/<RTT> \quad (15)$$

Given herein a ground on which the effective bandwidth BW can be calculated in the way described above. In the TCP communications, the packets are transmitted while restricting the output by the sliding window system. The number of the packets, which are to be outputted at one time on the window size basis, is restricted, and, after waiting till it is confirmed by the ACK (acknowledgement packet) given from the receiving-side communications device that the packets for the window size have been transferred, a next set of packets for the window size are outputted. The window size changes with a passage of time as the TCP communications proceed. According to the TCP, the window sized is adjusted by combining two algorithms for the slow start and for a congestion avoidance.

Immediately after establishing the TCP connection, with the slow start done, the window size is increased from a value "1" in the way of the exponential function. When the subnetworks eventually come to the congestion, however, the packets are discarded with the result that the ACP packet does not arrive at. The transmitting-side communications device, if the ACK packet does not arrive at within a predetermined period of time, judges that the subnetwork encounters the congestion, and the window size is adjusted. The adjustment of the window size is carried out by the congestion avoidance algorithm. That is, when the packet discard occurs, i.e, when the ACK packet does not arrive at within the predetermined time, the window size is reduced down to the half, and the window size is increased one by one till the packet discard occurs again. When the packet discard occurs, the window size is again reduced down to the half, and the same process is repeated. Accordingly, the performance of the TCP communications is determined mainly based on how long time interval the congestion avoidance occurs at, viz., based on a frequency of the packet discard. When the packet discard occurs, the congestion avoidance algorithm of the TCP recognizes it as a congestion signal, and halves the window size. At this time, even if the plurality of packets are discarded at one time, this is conceived as one single congestion signal. This is called the packet discard event. The packet discard event occurs when causing an overflow from a buffer (queue) of the router. Just before this overflow, it is observed that the round trip time of the measurement-oriented packet suddenly increases. It is therefore feasible to grasp a timing when the maximum congestion window size is reduced down to the half by detecting a timing when the round trip time is maximized.

Figure 13:
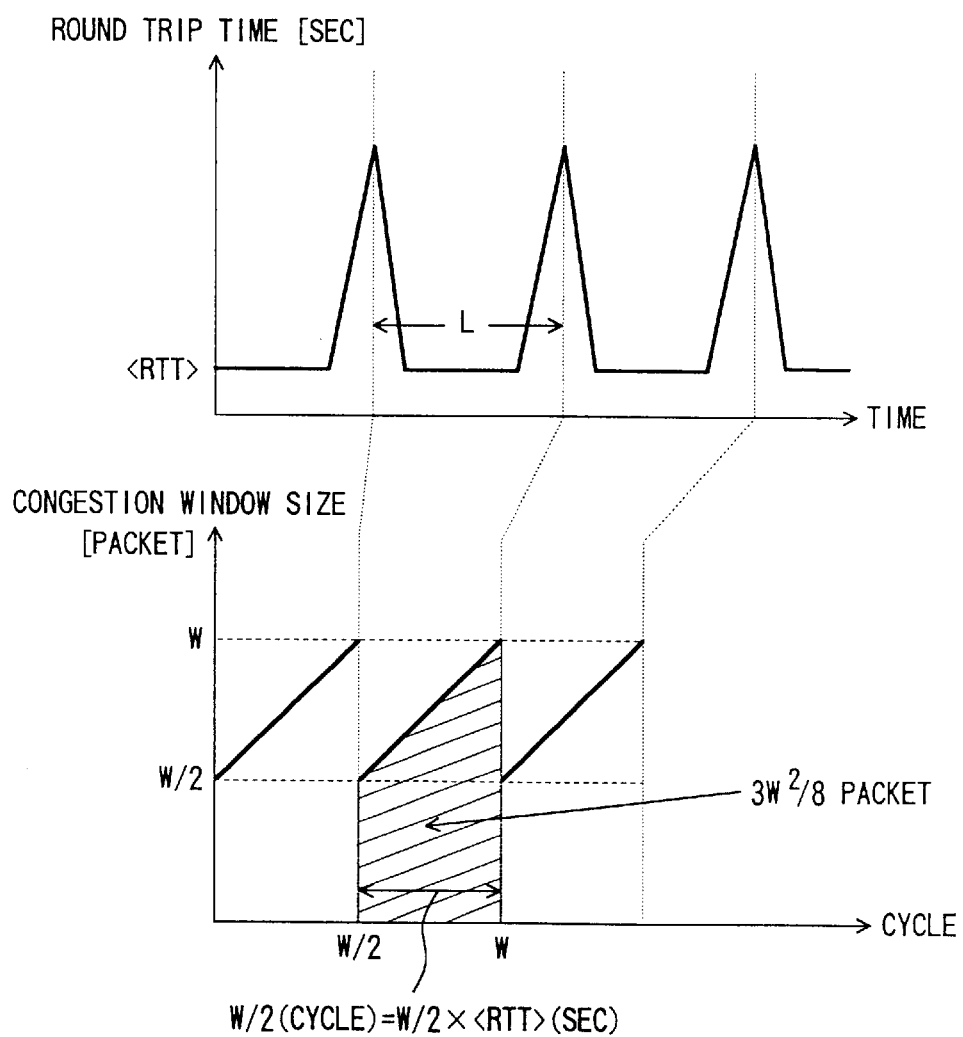
FIG. 13 is a diagram showing a relationship between a time change in a round trip time and a change in the window size in the second embodiment.

FIG. 13 shows this relationship. The following formula (16) is established between the maximum congestion window size W, the average or intermediate value <RTT> of the round trip times, and the time interval L of the packet discard event.

$$L = W/2 \times <RTT> \tag{16}$$

Hence, the maximum congestion window size W is given by the formula (17):

$$W = 2 \times L / <RTT> \tag{17}$$

At this time, the number of packets transmitted is $3W^2/8$ corresponding to a hatching area in FIG. 13, and therefore the estimated effective bandwidth BW can be obtained by the formula (18). Note that the symbol ^2 represents a square in this specification.

$$\begin{aligned} BW &= (\text{Number of transmitted packets}) / \\ &\quad (\text{Time expended for transmission}) \\ &= (3W \wedge 2/8 \times MSS)/(W/2 \times <RTT>) \\ &= (3/4) \times W \times MSS/<RTT> \end{aligned} \tag{18}$$

In accordance with the second embodiment discussed above, the echo packet of 10~20 pps may be transmitted as a measurement-oriented packet, however, the conventional technology of executing a simulation program simulating the TCP communications requires transmitting the measurement-oriented packet of 100~1,000 pps.

(Third Embodiment)

Figure 14:
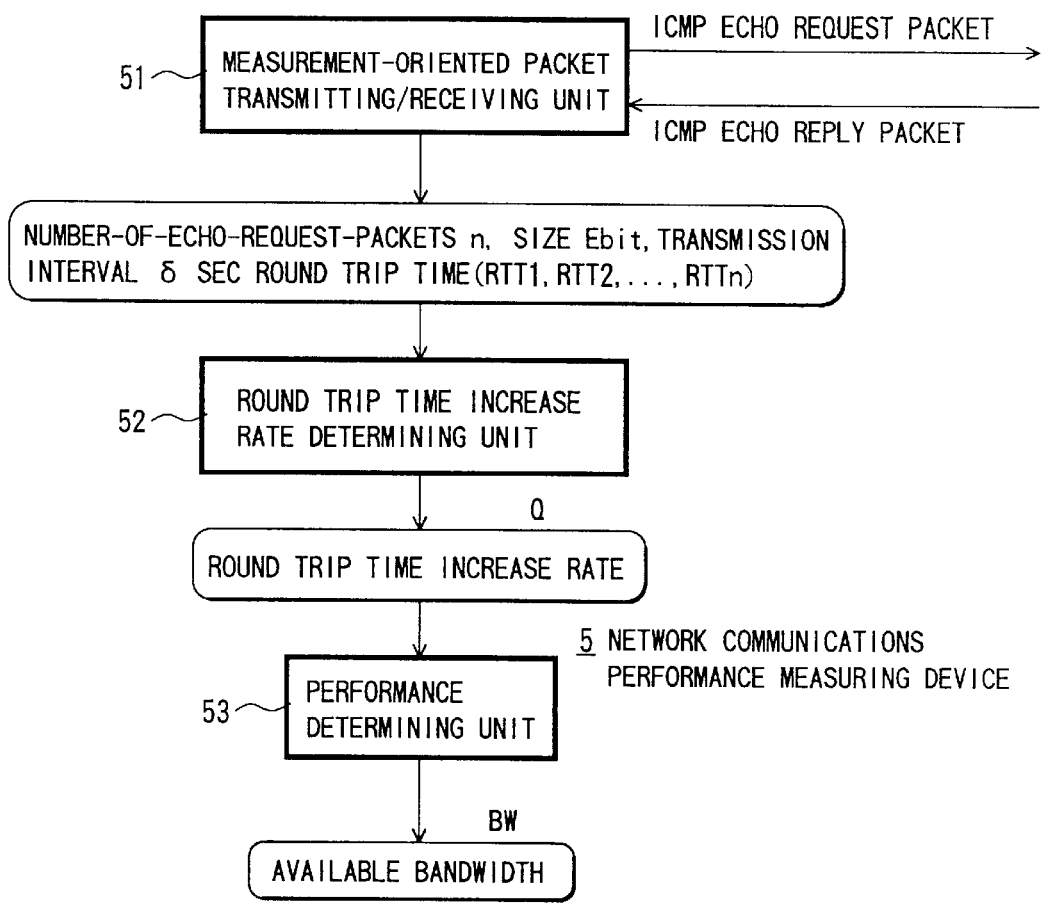
FIG. 14 is a block diagram showing a construction of a network communications performance measuring device in the third embodiment of the present invention.

FIG. 14 illustrates a detailed configuration of a network communications performance measuring device 5 in a third embodiment of the present invention. The network communications performance measuring device 5 is, as in the case of the TCP communications performance measuring device 4 in the second embodiment described above, disposed in the transmitting-side communications device 31 in the communications network system 3 shown in FIG. 11. The communications performance measuring device 5 transmits the measurement-oriented packet as an echo request packet to the receiving-side communications device 32, and receives an echo reply packet transmitted back by the receiving-side communications device 32, thereby measuring (estimating) a TCP communications performance and a UDP communications performance between these two communications devices, i.e., a network communications performance.

In the communications performance measuring device 5, a measurement-oriented packet transmitting/receiving unit 51 transmits the echo request packet (ICMP) as the measurement-oriented packet to the receiving-side communications device, and receives the echo reply packet (ICMP) transmitted back by the receiving-side communications device, thereby measuring a round trip time (RTT). A round trip time increment rate judging unit 52 determines a rate at which the round trip time of the measurement-oriented packet is longer than the round trip time of the measurement-oriented packet just anterior thereto. Further, a performance judging unit 53, when the rate at which the round trip time of the measurement-oriented packet is longer than the round trip time of the measurement-oriented packet just anterior thereto exceeds a threshold value, judges that a transfer speed of the measurement-oriented packet exceeds an available bandwidth (which may be conceived the same as the estimated effective bandwidth) of the network route, and thereby judges whether or not the available bandwidth of the network route is over a predetermined value.

The round trip time is measured as follows. The measurement-oriented packet transmitting/receiving unit 51 transmits the measurement-oriented packet as an ICMP echo request packet to the receiving-side communications device, and receives an ICMP echo reply packet transmitted back by the receiving-side communications device, thereby measuring the round trip time between the two communications devices. This measurement may involve the use of the above-mentioned "ping" normally loaded in the operating system such as UNIX and WindowsNT. The measurement-oriented packet transmitting/receiving unit 51 transmits the ICMP echo request packet to the receiving-side communications device by utilizing "ping". The receiving-side communications device transmits the ICMP echo reply packet back to the transmitting-side communications device. The measurement-oriented packet transmitting/receiving unit 51 measures by use of "ping" a time till the ICMP echo reply packet is received since the ICMP echo reply packet has been transmitted, and sequentially records as a value of the round trip time.

Figure 15:
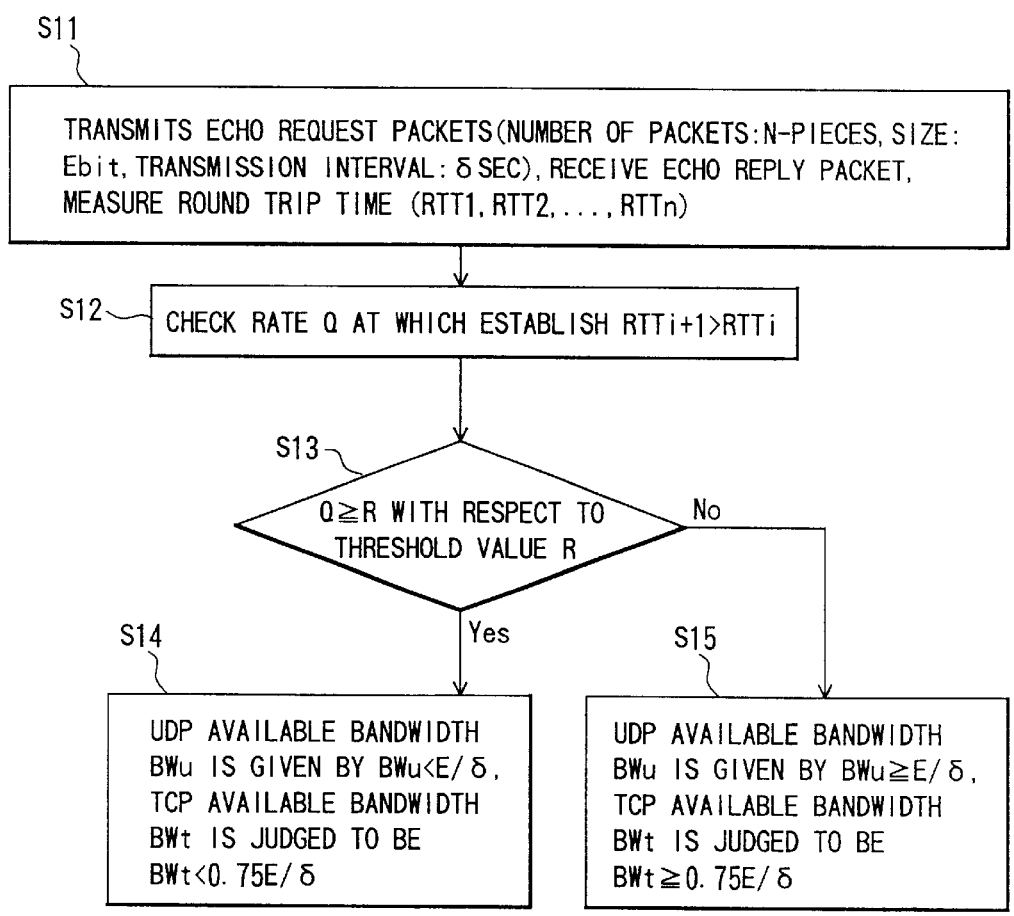
FIG. 15 is a flowchart showing a processing procedure in the third embodiment.

The performance judging unit 53 estimates the network available bandwidth from the round trip time as well as from a transmission interval of the measurement-oriented packet which has been measured by the measurement-oriented packet transmitting/receiving unit 51. A procedure of estimating the available bandwidth will be explained with reference to FIG. 15. The measurement-oriented packet transmitting/receiving unit 51 transmits n-pieces of ICMP echo request packets having a size Ebit at a transmission interval of δ sec. to the route of which the available bandwidth is to be checked. Then, The measurement-oriented packet transmitting/receiving unit 51 receives the ICMP echo reply packets transmitted back by the receiving-side communications device, and measures of the round trip times (RTT1, RTT2, ..., RTTn) of the respective packets (step S11). The performance judging unit 53 calculates such a rate Q in the formula (19) that the round trip time has a relationship of RTTi+1>RTTi (step S12).

$$\begin{aligned} Q &= L/(n-1) \\ L &= \sum_{i=0}^{n-1} Mi \\ Mi &= \begin{cases} 1 (RTTi+1 > RTTi) \\ 0 (RTTi+1 \le RTTi) \end{cases} \quad (0 \le i \le n-1) \end{aligned} \tag{19}$$

The performance judging unit 53, if the rate Q is over the threshold value R (approximately 0.8) (Q≥R), judges that the transfer speed (E/δ bps) of the measurement-oriented packet exceeds the available bandwidth of the route. Namely, an available bandwidth BWu (bps) of a route on which the communications are performed based on a protocol such as the UDP wherein the protocol itself does not control the transfer speed, is judged to the BWu<E/δ.

Further, an available bandwidth BWt (bps) in the case of performing the communications based on the TCP, is judged to be BWt<0.75 E/δ (steps S13, S14, S15).

Figure 16:
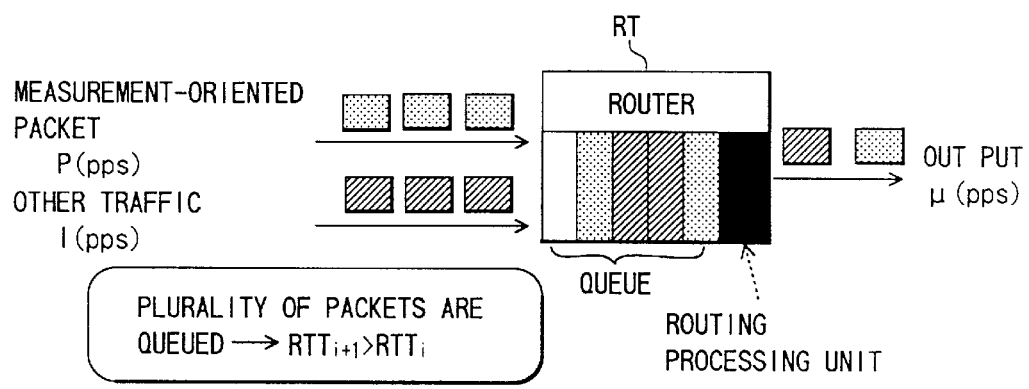
FIG. 16 is an explanatory diagram showing a delay router model on a network route.

Given next is a ground on which the available bandwidth can be calculated as described above. A behavior of a packet delay on the route in the IP network is considered based on a router model as shown in FIG. 16. Let herein $\mu$pps be a maximum packet passing performance of the router RT, Ppps be an inflow quantity of the measurement-oriented packets into the router RT, and Ipps be an inflow quantity of packets excluding the measurement-oriented packet. Further, a time interval δ at which the measurement-oriented packet flows into the router RT is given such as δ (sec)=1/P. Moreover, let n be the number of the measurement-oriented packets, and Ebit be a size of the measurement-oriented packet. Furthermore, the round trip times of the respective measurement-oriented packets are expressed such as RTT1, RTT2, . . . , RTTn (sec). Note that the available bandwidth of the route is designated by $\mu$-IPPs.

If the packet inflow quantity into the router RT does not exceed the maximum passing performance (P+I≦$\mu$), the packets are not accumulated in the queue of the router RT, and hence the round trip times RTT of the measurement-oriented packets are all substantially equal to each other. While on the other hand, if the packet inflow quantity into the router RT exceeds the maximum passing performance (P+I>$\mu$), the measurement-oriented packets are sequentially accumulated in the queue thereof, and therefore it might frequently happen that a processing time of an (i+1)th measurement-oriented packet is longer than a processing time of an i-th packet (RTTi+1>RTTi). At this time, the transfer speed P(=1/δ) of the measurement-oriented packet exceeds an upper limit of the available bandwidth of the route, and it can be presumed that the available bandwidth of this route is less than Ppps (i.e., less than PE (=E/δ bps) at the present. In the case of performing the communications by use of a protocol such as the UDP wherein the protocol itself does not control the transfer speed, the communications can be conducted with this available bandwidth. Further, it can be also presumed that the available bandwidth in the TCP is less than 0.75 Ppps (viz., less than 0.75 PE (=0.75 E/δ) bps).

Elucidated herein is a reason why the available bandwidth in the TCP is less than 0.75 Ppps. According to the TCP, the flow control using the window is implemented. In the TCP, after transmitting the packets having a quantity for the window size, the window size is increased when confirming that the packets have been transmitted without any troubles. By contrast, when confirming that the packets have been discarded midways on the route, the window size is reduced down to the half. With a repetition of this operation, the behavior of the window size in the TCP becomes as shown in FIG. 17.

Figure 17:
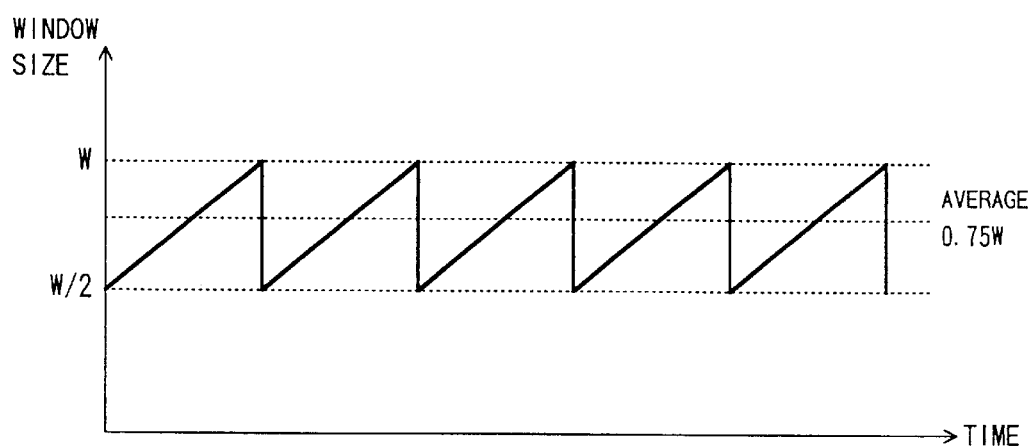
FIG. 17 is a diagram showing a behavior of the window size in the TCP.
Figure 18:
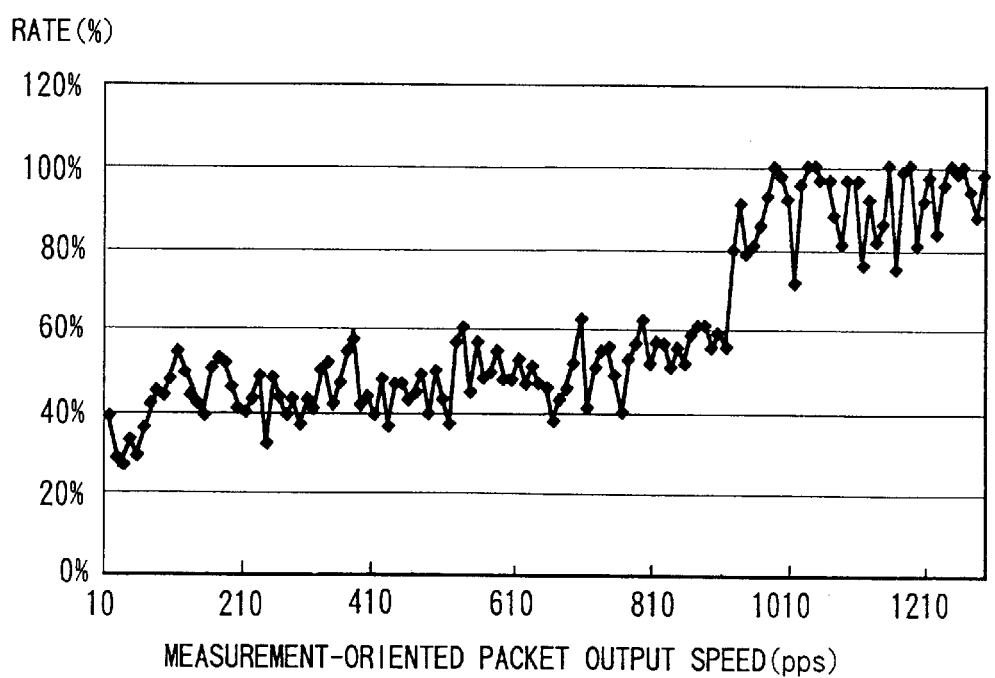
FIG. 18 is a diagram showing an example of checking an increase rate of the round trip time.

Referring to FIG. 17, a timing when the window size takes the maximum value W is just before the packet discard occurs, and hence the maximum performance of the route, it can be considered, is to be exhibited. Then, an average window size is 0.75-fold as small as the maximum window size, and it therefore follows that the TCP exhibits only 0.75-fold performance as small as the maximum performance of the route on the average. FIG. 18 shows a result of checking a rate Q at which to establish RTTi+1>RTTi, while changing in fact the output speed (transfer speed) of the measurement-oriented packet on a certain route. According to this result, assuming that a threshold value R for judging that the packet is queued in the router RT is set to 0.8, it can be presumed that the available bandwidth in the case of utilizing a protocol such as the UDP wherein the protocol itself does not control the transfer speed, is on the order of 920 pps, while the available bandwidth in the case of utilizing the TCP is given such as 920×0.75=690 pps. Thus, it can be judged whether or not the speed P of the measurement-oriented packet exceeds the available bandwidth of the route in the UDP, by checking whether or not the RTT of the measurement-oriented packet has a relationship such as RTTi+1>RTTi. It can be also judged whether or not 0.75P exceeds the available bandwidth in the TCP.

It can be checked by use of the method described above whether or not the available bandwidth of the network route in the case of utilizing the TCP and the UDP exceeds X bps. With a repetition of the operation based on the method described above while changing this parameter X by a split-half method, the network performance is thus examined, whereby the available bandwidth in the network can be estimated.

Figure 19:
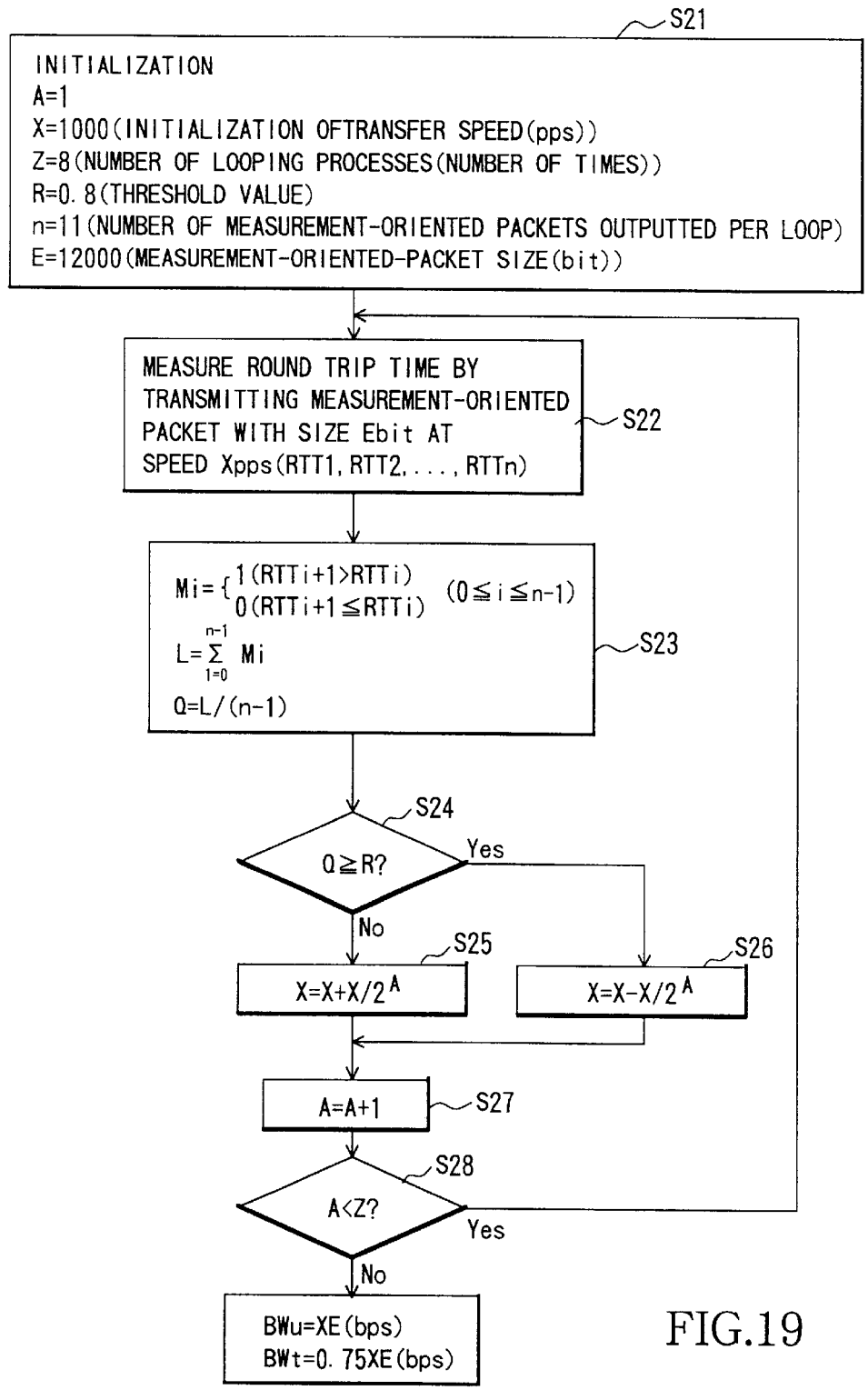
FIG. 19 is a flowchart showing a procedure of estimating an available bandwidth by a split-half method.

A procedure of processing based on this split-half method will be explained with reference to FIG. 19. To begin with, initialization is carried out as follows (S21). A is set to "1" (A=1). An initial value (1,000 pps) of the transfer speed of the measurement-oriented packet is put into X. A number-of-times-of-looping Z is set to "8". The threshold value R is set to "0.8". The number-of-measurement-oriented-packets n to be outputted per loop is set to "11". A measurement-oriented packet size E is set to 12,000 bit. The measurement-oriented packet having the size Ebit is outputted at the speed Xpps, and it is checked based on the measurement of the round trip time whether or not the available bandwidth of the network route exceeds Xpps (S22).

If the available bandwidth of the route exceeds (0≧R), X=X−X/2^A. Whereas if the available bandwidth of the route does not exceed Xpps (Q<R), X=X+X/2^A (S23, S24, S35, S36). A is set such as A=A+1 (S27). If A<Z, the processing returns to step S22. Further, if A≧Z, the processing comes to an end (S28). As a result, the available bandwidth in the vicinity of Xpps (XEbps) becomes the available bandwidth BWu of the network route in the case of utilizing the UDP. An available bandwidth BWt of the route in the case of utilizing the TCP is a value in the vicinity of 0.75 Xpps (0.75 XEbps).

Figure 20:
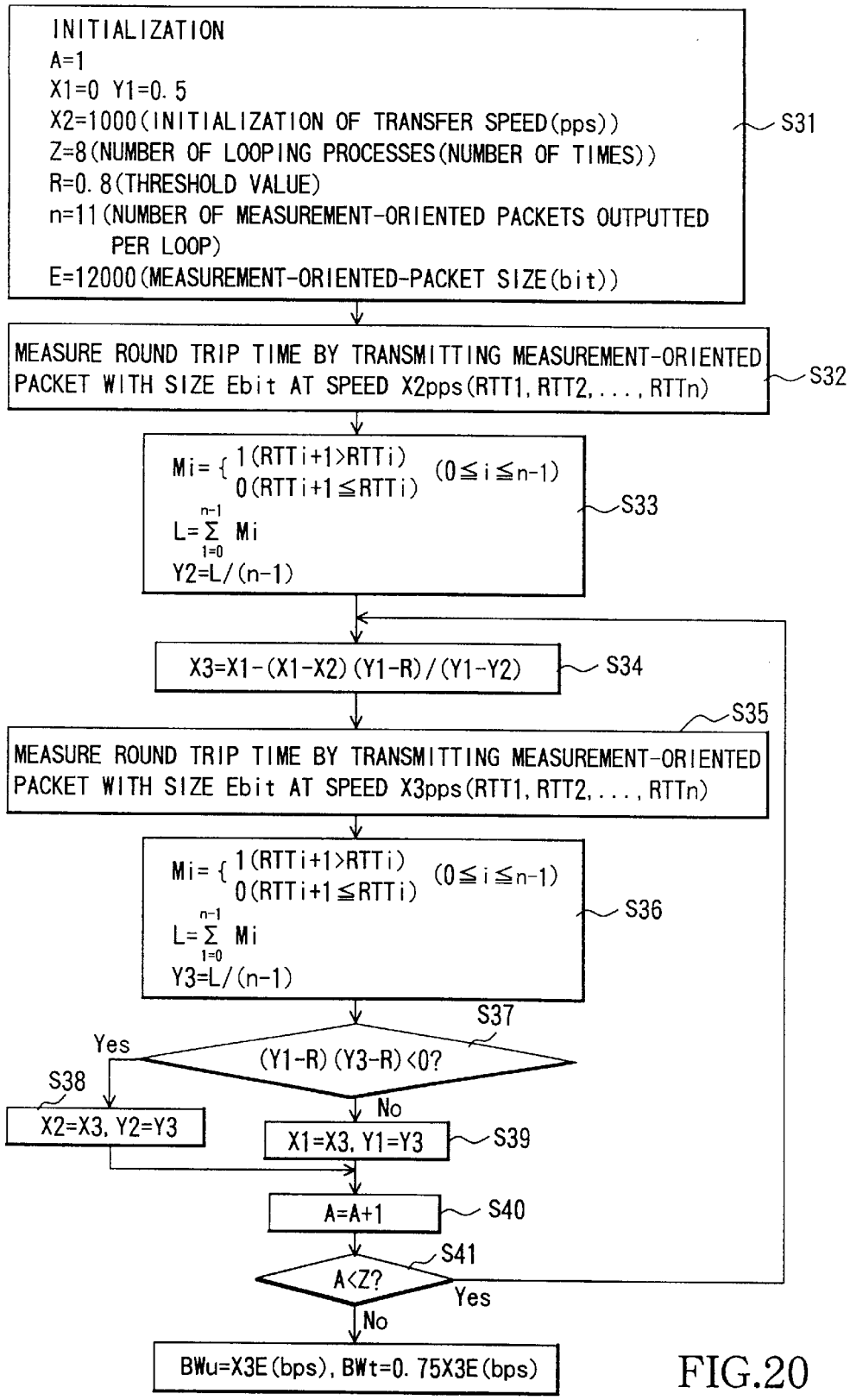
FIG. 20 is a flowchart showing a procedure of estimating the available bandwidth by a regular false method.

Next, a method of obtaining the available bandwidth based on a regula falsi (a rule of false position) method instead of the split-half method, will be explained with reference to FIG. 20. To start with, the regula falsi method will be outlined. The regula falsi method is defined as a method of solving an algebraic equation for obtaining "a" establishing f(a)=0 with respect to a function f(x), and takes the following procedures.

(1) Initial values of variables x1 and x2 are selected so as to establish f(x1)<0, and f(x2)>0.
(2) Two points (x1, f(x1)), and (x2, f(x2)) on the XY-plane are connected by a straight line L1.
(3) a point of intersection between the X-axis and L1 is set to (x3, 0).
(4) f(x1)×f(x2)<0, and therefore f(x3) is equal in sign to one of f(x1) and f(x2). When f(x3)×f(x1)>0, x3 is substituted into x1. When f(x3)×f(x1)>0, x3 is substituted into x2. Then, the operations after the procedure (2) are repeated. X1 and X2 gradually converge at the value "a".

Subsequently, the procedure of obtaining the available bandwidth based on the regula falsi method will be described. At the first onset, the following initialization is carried out (S31). A is set to "1" (A=1). X1 and Y1 are set such as X1=0, and Y1=0.5, and a maximum value (pps) in the measurement range is put into X2. The maximum value in the measurement range is such a value as to lead a recognition that "the available bandwidth is under this value". For instance, in the case of Ethernet having a transfer speed 10 Mbps, X2=10,000/E. Herein E is a measurement-oriented packet size (12,000 bit). Further, a number-of-times-of-looping Z is set to "8". Moreover, the threshold value R for judging that the packet is queued in the router RT is set to "0.8", and the number-of-measurement-oriented-packets n outputted per loop is set to "11". The measurement-oriented packet having a size Ebit is outputted at a speed X2pps, and there is examined a probability Y2 that the round trip time of the previous packet exceeds the round trip time of the packet just posterior thereto (S32, S33). A point at which a straight line shifted by −R in parallel in the Y-axis direction intersects a straight line passing through coordinates (X1, Y1) and (X2, Y2) on the XY-plane, is set to (X3, 0), in which case X3=X1−(X1−X2)(Y1−R)/(Y1−Y2) (step S34).

Examined is a probability Y3 that the round trip time of the previous packet exceeds the round trip time of the packet just posterior thereto (S35, S36). If (Y1−R) (Y3−R)<0, X2=X3, and Y2=Y3. Whereas if not, X1=X3, and Y1=Y3 (S37, S38, S39). A is set such as A=S+1 (S40). If A<Z, the processing goes back to step S34. Further, if A≧Z, the processing is finished (S41). As a result, an available bandwidth in the vicinity of X3pps (EX3bps) becomes the available bandwidth BWu of the network route in the case of utilizing the UDP. An available bandwidth BWt of the route in the case of utilizing the TCP is a value in the vicinity of 0.75 X3pps (0.75 EX3bps).

Figure 21:
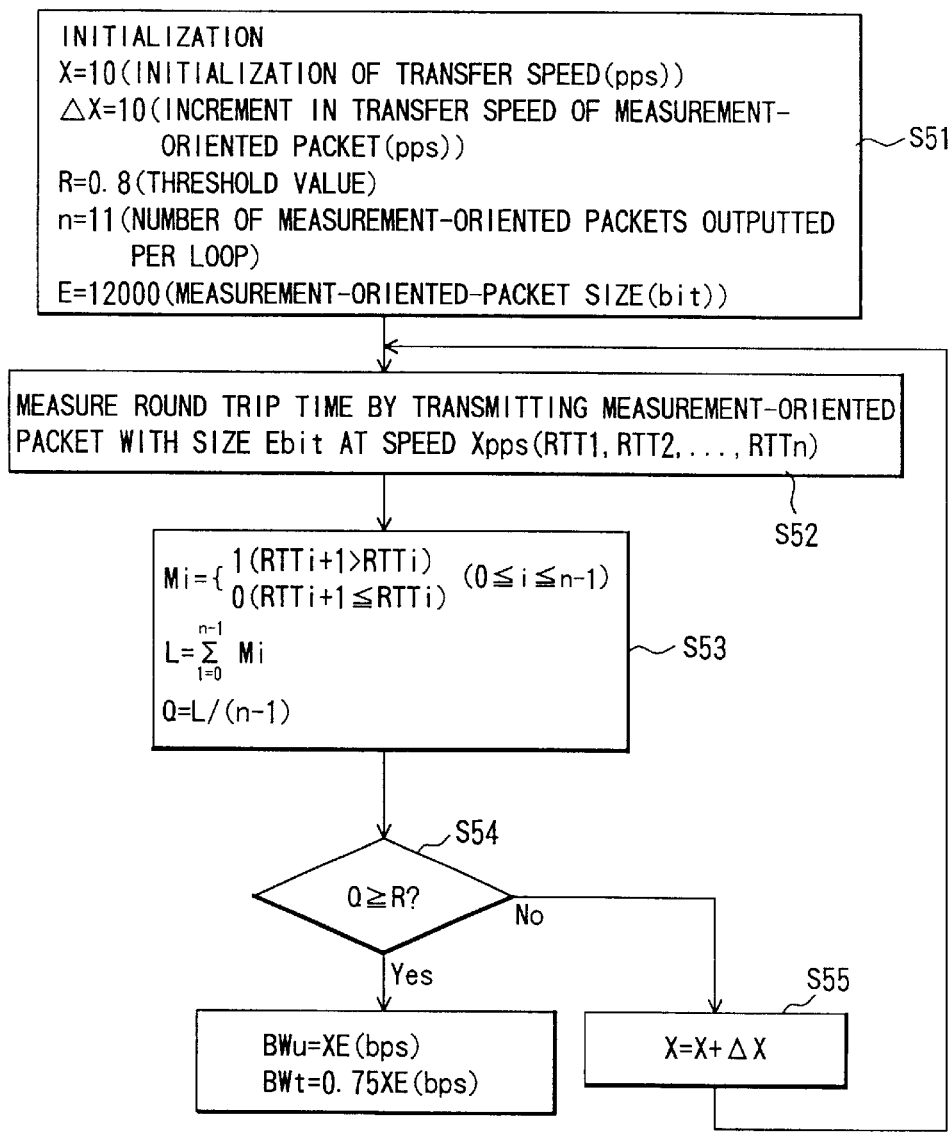
FIG. 21 is a flowchart showing a procedure of estimating the available bandwidth by a monotone increasing method.

Further, the transfer speed of the measurement-oriented packet is changed by a monotone increasing method or a monotone decreasing method, whereby the available bandwidth can be also obtained. FIG. 21 shows a processing procedure of the monotone increasing method. Referring to FIG. 21, at first the initialization is executed in the way which follows (S51). An initial value (1 through 10 pps) of the transfer speed of the measurement-oriented packet is put into X. Further, let ΔX (10 through 100 pps) be an increment in the transfer speed of the measurement-oriented packet. Moreover, the threshold value R is set to "0.8", and the number-of-measurement-oriented-packets n outputted per loop is set to "11". Then, the size Ebit of the measurement-oriented packet is set to 12,000. The measurement-oriented packet having the size Ebit is outputted at a speed Xpps, and it is checked based on the measurement of the round trip time whether or not the available bandwidth of the network route exceeds Xpps (S52, S53). If the available bandwidth of the route does not exceed Xpps (when Q<R), X=X+ΔX, and the processing returns to step S52 (S54, S55).

If the available bandwidth of the route exceeds Xpps (when Q≧R), the processing comes to an end (S54). An available bandwidth in the vicinity of Xpps (XEbps) becomes the available bandwidth BWu of the network route in the case of utilizing the UDP. The available bandwidth BWt of the route in the case of utilizing the TCP is a value in the vicinity of 0.75 Xpps (0.75 XEbps).

Figure 22:
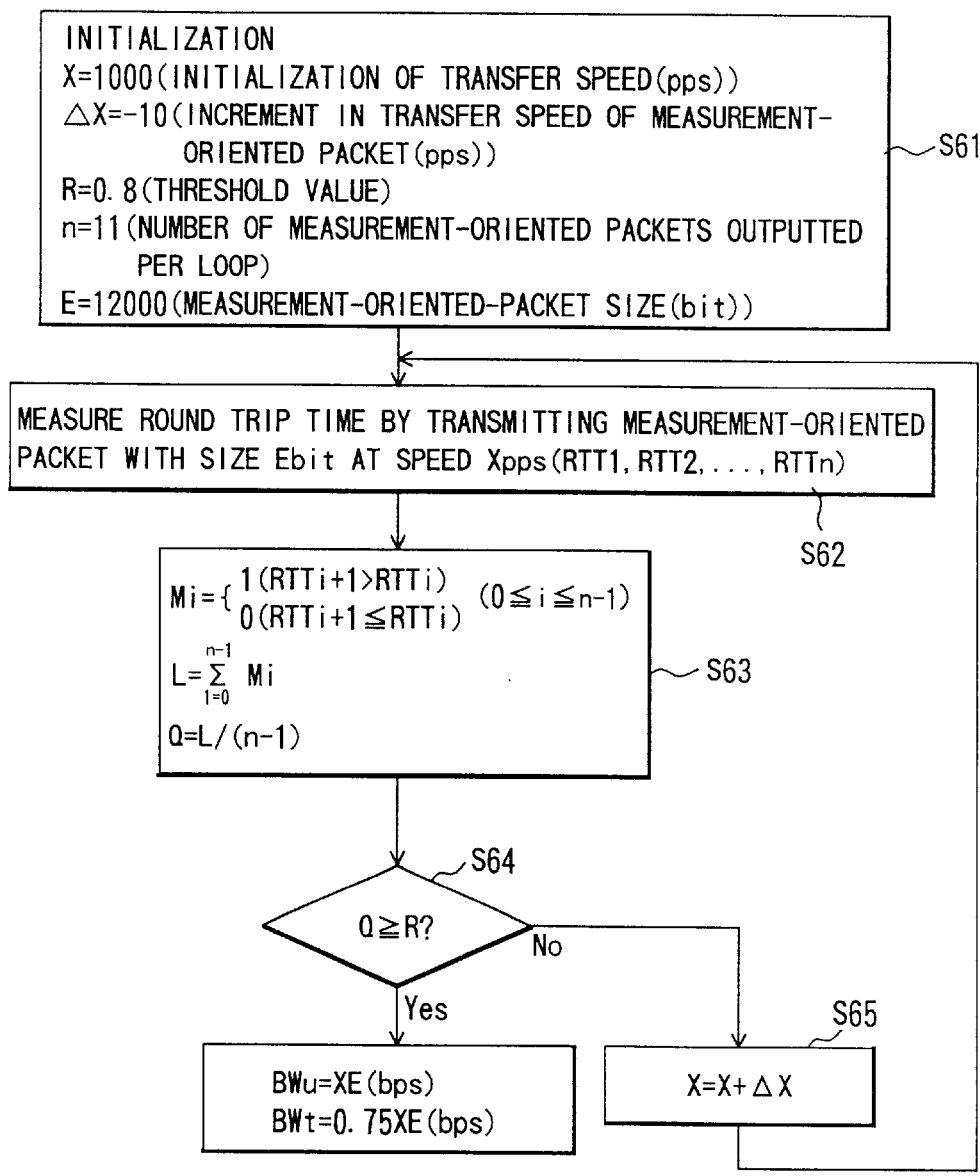
FIG. 22 is a flowchart showing a procedure of estimating the available bandwidth by a monotone decreasing method.

Next, FIG. 22 shows a processing procedure of the monotone decreasing method. Referring to FIG. 22, at the first onset, the initialization is executed in the way which follows (S61). A maximum value (1,000 pps) in the measurement range is substituted into X as an initial value of the transfer speed of the measurement-oriented packet. Further, let ΔX (−10 through −100 pps) be an increment in the transfer speed of the measurement-oriented packet. Moreover, the threshold value R is set to "0.8", and the number-of-measurement-oriented-packets n outputted per loop is set to "11". Then, the size Ebit of the measurement-oriented packet is set to 12,000. The measurement-oriented packet having the size Ebit is outputted at the speed Xpps, and it is checked based on the measurement of the round trip time whether or not the available bandwidth of the network route exceeds Xpps (S62, S63). If the available bandwidth of the route exceeds Xpps (when Q>R), X=X+ΔX, and the processing returns to step S62 (S64, S65).

If the available bandwidth of the route does not exceed Xpps (when Q≦R), the processing comes to an end (S64). An available bandwidth in the vicinity of Xpps (XEbps) becomes the available bandwidth BWu of the network route in the case of utilizing the UDP. The available bandwidth BWt of the route in the case of utilizing the TCP is a value in the vicinity of 0.75 Xpps (0.75 XEbps).

For example, in a TCP available bandwidth measurement tool "Treno" (M. Matthis and J. Mahdavi, "Diagnosis Internet Congestion with a Transport Layer Performance Tool, "Proceedings of INET 96 , Montreal, June 1996.), there is a case of using over 10,000 packets for a 20-sec. measurement. According to the method of the present invention using the split-half method and the regula falsi method, assuming that twenty packets are transmitted for one looping process and that the available bandwidth is estimated through eight looping processes, the measurement thereof can be attained by use of 160 packets. Further, according to the method of the present invention involving the use of the monotone increasing method and the monotone decreasing method, the transfer speed of the measurement-oriented packet is required with every 10 pps in the range of 10 through 1,000 pps, and the available bandwidth is estimated by transmitting the 20 packets for one looping process, in which case the measurement can be attained by use of 2,000 packets. Further, "Treno" requires a time as much as repeating the transmission and receipt of the packets and changing the window size in order to simulate the behavior of the TCP, and needs a measurement time on the order of at least 10 to 60 sec. If the split-half method and the regula falsi method described above are employed, a high-speed measurement can be implemented on the order of several seconds.

Although only a few embodiments of this invention have been described in detail above, those skilled in the art will readily appreciate that many modifications are possible in the preferred embodiments without departing from the novel teachings and advantages of this invention. Accordingly, all such modifications are intended to be included within the scope of this invention as defined by the following claims.

What is claimed is:

1. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnect OSI Reference model, and obtaining, per session, log information containing address information of a transmitting-side communications device and a receiving-side communications device, a packet category and a packet size from the packets;

session managing means for managing a flow of the packets per session;

performance index detecting means for obtaining, as performance indexes, a round trip time, a maximum segment size and an average congestion window size on the basis of the log information;

storing means for recording values of the performance indexes detected by said performance index detecting means per session designated by said session managing means; and performance calculating means for obtaining an effective bandwidth representing performance in the TCP communications by calculating the values of these performance indexes which are recorded in said storing means.

2. The apparatus for measuring communications performance according to claim 1, wherein said performance index detecting means detects as the performance index a packet discard rate instead of the average congestion window size, and said performance calculating means obtains the effective bandwidth representing the performance in the TCP communications, with the packet discard rate, the round trip time and the maximum segment size being used as values of the performances indexes.

3. The apparatus for measuring communications performance according to claim 1 wherein said performance index detecting means detects as the performance index a packet discard event rate instead of the average congestion window size, and said performance calculating means obtains the effective bandwidth representing the performance in the TCP communications, with the packet discard event rate, the round trip time and the maximum segment size being used as values of the performance indexes.

4. The apparatus for measuring communications performance according to claim 1, wherein the round trip is obtained from a difference between a transmission timing and a receipt timing of the packet transmitted and received in handshaking between said transmitting-side communications device and said receiving-side communications device when establishing a TCP connection.

5. The apparatus for measuring communications performance according to claim 1 wherein the maximum segment size is obtained from the packet size of the packets.

6. The apparatus for measuring communications performance according to claim 2, wherein the round trip time is obtained from a difference between a transmission timing and a receipt timing of the packet transmitted and received in handshaking between said transmitting-side communications device and said receiving-side communications device when establishing a TCP connection, the maximum segment size is obtained from a packet size of the packets, the packet discard rate is obtained by dividing, by the total number of packets, the number of discarded packets which is the number of the packets re-transmitted after a sequence number of the packet has been reversed, and the effective bandwidth BW is obtained by the formula: $BW = C \times MSS/RTT/\sqrt{p}$, where RTT is the round trip time, MSS is the maximum segment size, p is the packet discard rate, and C is the constant minutely adjusted within the range of 1±0.3.

7. The apparatus for measuring communications performance according to claim 3, wherein the round trip time is obtained from a difference between a transmission timing and a receipt of the packet transmitted and received in handshaking between said transmitting-side communications device and said receiving-side communications device when establishing a TCP connection, the maximum segment size is obtained from a packet size of the packets, the packet discard event rate is, if an occurrence of reverse of a sequence number is conceived as one single packet discard event, obtained by dividing the number of the packet discard events by the total number of packets, and the effective bandwidth BW is obtained by the formula: $BW = C \times MSS/RTT/\sqrt{q}$, where RTT is the round trip time, MSS is the maximum segment size, q is the packet discard event rate, and C is the constant minutely adjusted within the range of 1±0.3.

8. The apparatus as in claim 1 wherein the average congestion window size is obtained by counting the number of the packets transmitted or received within one single window cycle and by obtaining an average value of the number of the packets during a period for which the window size is adjusted by a congestion avoidance algorithm.

9. The apparatus as in claim 2, wherein the packet discard rate is obtained by dividing, by the total number of packets, the number of discarded packets which is the number of the packets re-transmitted after a sequence number of the packet has been reversed.

10. The apparatus as in claim 3, wherein the packet discard event rate is, if an occurrence of reverse of a sequence number is connected as one single packet discard event, obtained by dividing the number of the packet discard events by the total number of packets.

11. The apparatus as in claim 1, wherein the effective bandwidth BW is obtained by a formula: $BW = <W> \times MSS/RTT$, where RTT is the round trip time, MSS is the maximum segment size, and $<W>$ is the average congestion window size.

12. The apparatus as in claim 2, wherein the effective bandwidth BW is obtained by a formula: $BW = C \times MSS/RTT/\sqrt{p}$, where RTT is the round trip time, MSS is the maximum segment size, p is the packet discard rate, and C is the constant minutely adjusted within a range of 1±0.3.

13. The apparatus as in claim 3, wherein the effective bandwidth BW is obtained by a formula: $BW = C \times MSS/RTT/\sqrt{q}$, where RTT is the round trip time, MSS is the maximum segment size, q is the packet discard event rate, and C is the constant minutely adjusted within the range of 1+0.3.

14. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the average congestion window size is obtained by counting the number of the packets transmitted or received within one single window cycle and by obtaining an average value of the number of the packets during a period for which the window size is adjusted by a congestion avoidance algorithm.

15. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating the values of these performance indexes, wherein the packet discard rate is obtained by dividing, by the total number of packets, the number of discarded packets which is the number of the packets re-transmitted after a sequence number of the packet has been reversed.

16. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the packet discard event rate is, if in occurrence of reverse of a sequence number is conceived as one single packet discard event, obtained by dividing the number of the packet discard events by the total number of packets.

17. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the effective bandwidth BW is obtained by a formula: $BW = <W> \times MSS/RTT$, where RTT is the round trip time, MSS is the maximum segment size, and $<W>$ is the average congestion window size.

18. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the effective bandwidth BW is obtained by a formula: $BW = C \times MSS/RTT/\sqrt{p}$, where RTT is the round trip time, MSS is the maximum segment size, p is the packet discard rate, and C is the constant minutely adjusted within a range of $1 \pm 0.3$.

19. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the effective bandwidth BW is obtained by formula: $BW = C \times MSS/RTT/\sqrt{q}$, where RTT is the round trip time, MSS is the maximum segment size, q is the packet discard event rate, and G is the constant minutely adjusted within the range of $1+0.3$.

20. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip time and a maximum segment size, and any one of an average congestion window size, a packet discard rate and a packet discard event rate on the basis of the log information; and performance calculating means for obtaining an effective bandwidth representing performance in the TCP communications by calculating values of these performances indexes, wherein the round trip time is obtained from a difference between a transmission timing and a receipt timing of each of the packets transmitted and received in handshaking between said transmitting-side communications device and said receiving-side communications device when establishing a TCP connection, the maximum segment size is obtained from a packet size of the packets, the average congestion window size is obtained by counting the number of the packets transmitted or received within one single window cycle and by obtaining an average value of the number of the packets during a period for which the window size is adjusted by a congestion avoidance algorithm, the packet discard rate is obtained by dividing, by the total number of packets, the number of discarded packets which is the number of packets re-transmitted after a sequence number of the packet has been reversed, the packet discard event rate is, if an occurrence of reverse of the sequence number is conceived as one single packet discard event, obtained by dividing the number of packet discard events by the total number of packets, and the effective bandwidth BW is obtained by any one of the formulae: $BW=<W>\times MSS/RTT$, $BW=C\times MSS/RTT/\sqrt{p}$, and $BW=C\times MSS/RTT/\sqrt{q}$, where RTT is the round trip time, MSS is the maximum segment size, <W> is the average congestion window size, p is the packet discard rate, q is the packet discard event rate, and C is the constant minutely adjusted within the range of $1\pm 0.3$.

21. An apparatus for measuring communications performance, comprising:

packet monitoring means for monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

performance index detecting means for obtaining, as performance indexes, both of a round trip and a maximum segment size, and any one of an average congestion window size, a packet discard rate and a packet discard event rate on the basis of the log information; and performance calculating means for obtaining an effective bandwidth representing performance in the TCP communications by calculating values of these performance indexes, wherein the round trip time is obtained from a difference between a transmission timing and a receipt timing of the packet transmitted and received in handshaking between said transmitting-side communications device and said receiving-side communications device when establishing a TCP connection, the maximum segment size is obtained from a packet size of the packets, the average congestion window size is obtained by counting the number of the packets transmitted or received within one single window cycle and by obtaining an average value of the number of the packets during a period for which the window size is adjusted by a congestion avoidance algorithm, and the effective bandwidth BW is obtained by the formula: $BW=<W>\times MSS/RTT$, where RTT is the round trip time, MSS is the maximum segment size, and <W> is the average congestion window size.

22. An apparatus for measuring communications performance, comprising:

measuring means for measuring respectively a maximum segment size and a round trip time by transmitting and receiving a small number of measurement-oriented packets at an interval of a fixed time;

performance index detecting means for obtaining an average value or an intermediate value of the round trip times, and estimating a maximum congestion window size from a time change in the round trip time; and performance calculating means for obtaining an effective bandwidth representing performance in Transmission Control Protocol TCP communications on the basis of the maximum segment size, the average value or the intermediate value of the round trip times, and the maximum congestion window size, wherein the round trip time and the maximum segment size are measured by transmitting and receiving as one of the measured-oriented packets an echo packet of an Internet Control Message Protocol ICMP defined as a network layer protocol of the OSI Reference model, and an echo packet of a TCP and a User Datagram Protocol UDP which are defined as protocols of a transport layer of the OSI Reference model.

23. An apparatus for measuring communications performance, comprising:

measuring means for measuring respectively a maximum segment size and a round trip time by transmitting and receiving a small number of measurement-oriented packets at an interval of a fixed time;

performance index detecting means for obtaining an average value or an intermediate value of the round trip times, and estimating a maximum congestion window size from a time change in the round trip time; and performance calculating means for obtaining an effective bandwidth representing performance in Transmission Control Protocol TCP communications on the basis of the maximum segment size, the average value or the intermediate value of the round trip times, and the maximum congestion window size, wherein the maximum congestion window size is given by obtaining the average value or the intermediate value of cycles of a packet discard event from the time change in the round trip time, multiplying this value by 2, and dividing the multiplied value by the average value or the intermediate value of the round trip time.

24. An apparatus for measuring communications performance, comprising:

measuring means for measuring respectively a maximum segment size and a round trip time by transmitting and receiving a small number of measurement-oriented packets at an interval of a fixed time;

performance index detecting means for obtaining an average value or an intermediate value of the round trip times, and estimating a maximum congestion window size from a time change in the round trip time; and performance calculating means for obtaining an effective bandwidth representing performance in Transmission Control Protocol TCP communications on the basis of the maximum segment size, the average value or the intermediate value of the round trip times, and the maximum congestion window size, wherein the effective bandwidth BW is obtained by the formula: BW= $(3/4) \times W \times MSS/<RTT>$, where $<RTT>$ is the average value or the intermediate value of the round trip times, MSS is the maximum segment size, and W is the maximum congestion window size.

25. An apparatus for measuring communications performance, comprising:

measuring means for measuring respectively a maximum segment size and a round trip time by transmitting and receiving a small number of measurement-oriented packets at an interval of a fixed time;

performance index detecting means for obtaining an average value or an intermediate value of the round trip times, and estimating a maximum congestion window size from a time change in the round trip time; and performance calculating means for obtaining an effective bandwidth representing performance in Transmission Control Protocol TCP communications on the basis of the maximum segment size, the average value or the intermediate value of the round trip times, and the maximum congestion window size, wherein the round trip time and the maximum segment size are measured by transmitting and receiving as one of the measured-oriented packets an echo packet of an Internet Control Message Protocol ICMP defined as the network layer protocol of the Open Systems Interconnect OSI Reference model, and the echo packet of the TCP and a User Datagram Protocol UDP which are defined as the protocols of the transport layer of the OSI Reference model, the maximum congestion window size is obtained by detecting a maximal point of the round trip time from the time change in the round trip, multiplying by 2 a time interval till the round trip time becomes maximal next since it has become maximal, and dividing the multiplied time interval by the average value or the intermediate value of the round trip times, and the effective bandwidth BW is obtained by the formula: $BW=(3/4) \times W \times MSS/<RTT>$, where $<RTT>$ is the average value or the intermediate value of the round trip times, MSS is the maximum segment size, and W is the maximum congestion window size.

26. A method of measuring communications performance, comprising:

measuring a round trip time by transmitting and receiving a small number of measurement-oriented packets at a variable interval of a fixed time;

determining a rate at which the round trip time of one of the measurement-oriented packets is longer than the round trip time of another of the measurement-oriented packets just anterior thereto; and checking whether or not the rate is over a predetermined threshold value, then, if over, judging that a transfer speed of one of the measurement-oriented packets exceeds an available bandwidth of a network route, and thereby judging that the available bandwidth of the network route in any one of a case where the communications are performed by use of a protocol of a transport layer of the Open Systems Interconnection OSI Reference model in which the protocol itself such as a User Datagram Protocol UDP does not control the transfer speed and a case where the communications are performed by use of a Transmission Control Protocol TCP defined as the protocol of the transport layer of the OSI Reference model, exceeds a certain predetermined value.

27. An apparatus for measuring communications performance, comprising:

measuring means for measuring a round trip time by transmitting and receiving a small number of measurement-oriented packets at a variable interval of a fixed time;

rate determining means for determining a rate at which the round trip time of one of the measurement-oriented packets is longer than the round trip time of another of the measurement-oriented packets just anterior thereto; and performance determining means for checking whether or not the rate is over a predetermined threshold value, then, if over, judging that a transfer speed of the one of the measurement-oriented packets exceeds an available bandwidth of a network route, and thereby judging that the available bandwidth of the network route in a case where the communications are performed by use of a protocol of a transport layer of the Open Systems Interconnection OSI Reference model in which the protocol itself such as a User Datagram Protocol UDP does not control the transfer speed, exceeds a certain predetermined value.

28. The apparatus for measuring communications performance according to claim 27, wherein a process of judging whether or not the rate exceeds the threshold value while changing a value of the transfer speed of the one of the measurement-oriented packets by a split-half method, is repeated a predetermined number of times, and there is estimated the available bandwidth of the network route in any one of the case where the communications are performed by use of the UDP that the protocol itself does not control the transfer speed, and the case where the communications are performed by use of the TCP.

29. The apparatus for measuring communications performance according to claim 27, wherein the process of judging whether or not the rate exceeds the threshold value while changing the value of the transfer speed of the one of the measurement-oriented packets by a regula falsi method, is repeated a predetermined number of times, and there is estimated the available bandwidth of the network route in any one of the case where the communications are performed by use of the UDP that the protocol itself does not control the transfer speed, and the case where the communications are performed by use of the TCP.

30. The apparatus for measuring communications performance according to claim 27, wherein the process of judging whether or not the rate exceeds the threshold value while changing the value of the transfer speed of the one of the measurement-oriented packets by a monotone increasing method, is repeated a predetermined number of times, and there is estimated the available bandwidth of the network route in any one of the case where the communications are performed by use of the UDP that the protocol itself does not control the transfer speed, and the case where the communications are performed by use of the TCP.

31. The apparatus for measuring communications performance according to claim 27, wherein the process of judging whether or not the rate exceeds the threshold value while changing a value of the transfer speed of the one of the measurement-oriented packets by a monotone decreasing method, is repeated a predetermined number of times, and there is estimated the available bandwidth of the network route in any one of the case where the communications are performed by use of the UDP that the protocol itself does not control the transfer speed, and the case where the communications are performed by use of the TCP.

32. An apparatus for measuring communications performance, comprising:

measuring means for measuring a round trip time by transmitting and receiving a small number of measurement-oriented packets at a variable interval of a fixed time;

rate determining means for determining a rate at which the round trip time of one of the measurement-oriented packets is longer than the round trip time of another of the measurement-oriented packets just anterior thereto; and performance determining means for checking whether or not the rate is over a predetermined threshold value, then, if over, judging that a transfer speed of the one of the measurement-oriented packets exceeds an available bandwidth of a network route, and thereby judging that the available bandwidth of the network route in a case where the communications are performed by use of a Transmission Control Protocol TCP defined as a protocol of the transport layer of the Open Systems Interconnection OSI Reference model, exceeds a certain predetermined value.

33. A method for measuring communications performance, comprising:

monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

obtaining, as performance indexes, both of a round trip time and a maximum segment size, and any one of an average congestion window size, a packet discard rate and a packet discard event rate on the basis of the log information; and obtaining an effective bandwidth representing performance in the TCP communications by calculating values of these performance indexes, wherein:

obtaining the round trip time from a difference between a transmission timing and a receipt timing of each of the packets transmitted and received in handshaking between said transmitting-side communications device and said receiving-side communications device when establishing a TCP connection, obtaining the maximum segment size from a packet size of the packets, obtaining the average congestion window size by counting the number of the packets transmitted or received within one single window cycle and by obtaining an average value of the number of the packets during a period for which the window size is adjusted by a congestion avoidance algorithm, obtaining the packet discard rate by dividing, by the total number of packets, the number of discarded packets which is the number of packets re-transmitted after a sequence number of the packet has been reversed, obtaining the packet discard event rate, if an occurrence of reverse of the sequence number is conceived as one single packet discard event, by dividing the number of packet discard events by the total number of packets, and obtaining the effective bandwidth BW by any one of the formulae: $BW = \langle W \rangle \times MSS/RTT$, $BW = C \times MSS/RTT/\sqrt{p}$, and $BW = C \times MSS/RTT/\sqrt{q}$, where RTT is the round trip time, MSS is the maximum segment size, $\langle W \rangle$ is the average congestion window size, p is the packet discard rate, q is the packet discard event rate, and C is the constant minutely adjusted within the range of $1 \pm 0.3$.

34. A method for measuring communications performance, comprising:

monitoring a variable length packet in Transmission Control Protocol TCP communications through which packets are transmitted and received based on a TCP defined as a protocol of a transport layer of the Open Systems Interconnection OSI Reference model, and obtaining log information containing address information of a transmitting-side communications device and a receiving-side communications device, a packet category and a packet size from the packets;

obtaining, as performance indexes, both of a round trip time and a maximum segment size, and any one of an average congestion window size, a packet discard rate and a packet discard event rate on the basis of the log information; and obtaining an effective bandwidth representing performance in the TCP communications by calculating values of these performance indexes, wherein:

obtaining the round trip time from a difference between a transmission timing and a receipt timing of the packets transmitted and received in handshaking between said transmitting-side communications device and said receiving-side communications device when establishing a TCP connection, obtaining the maximum segment size from a packet size of the packets, obtaining the average congestion window size by counting the number of the packets transmitted or received within one single window cycle and by obtaining an average value of the number of the packets during a period for which the window size is adjusted by a congestion avoidance algorithm, and obtaining the effective bandwidth BW by the formula: $BW = \langle W \rangle \times MSS/RTT$, where RTT is the round trip time, MSS is the maximum segment size, and <W> is the average congestion window size.

35. A method for measuring communications performance, comprising:

measuring respectively a maximum segment size and a round trip time by transmitting and receiving a small number of measurement-oriented packets at an interval of a fixed time;

obtaining an average value or an intermediate value of the round trip times, and estimating a maximum congestion window size from a time change in the round trip time; and obtaining an effective bandwidth representing performance in Transmission Control Protocol TCP communications on the basis of the maximum segment size, the average value or the intermediate value of the round trip times, and the maximum congestion window size, wherein the round trip time and the maximum segment size are measured by transmitting and receiving as one of the measured-oriented packets an echo packet of an Internet Control Message Protocol ICMP defined as the network layer protocol of the Open Systems Interconnection OSI Reference model, and the echo packet of the TCP and a User Datagram Protocol UDP which are defined as the protocols of the transport layer of the OSI Reference model, obtaining the maximum congestion window size by detecting a maximal point of the round trip time from the time change in the round trip, multiplying by 2 a time interval till the round trip time becomes maximal next since it has become maximal, and dividing the multiplied time interval by the average value or the intermediate value of the round trip times, and obtaining the effective bandwidth BW by the formula: BW=(3/4)×W×MSS/<RTT>, where <RTT> is the average value or the intermediate value of the round trip times, MSS is the maximum segment size, and W is the maximum congestion window size.

36. The apparatus for measuring communications performance according to claim 32, wherein a process of judging whether or not the rate exceeds the threshold value while changing a value of the transfer speed of the one of the measurement-oriented packets by a split-half method, is repeated a predetermined number of time, and there is estimated the available bandwidth of the network route in any one of the case where the communications are performed by use of the UDP that the protocol itself does not control the transfer speed, and the case where the communications are performed by use of the TCP.

37. The apparatus for measuring communications performance according to claim 32, wherein the process of judging whether or not the rate exceeds the threshold value while changing the value of the transfer speed of the one of the measurement-oriented packets by a regula falsi method, is repeated a predetermined number of times, and there is estimated the available bandwidth of the network route in any one of the case where the communications are performed by use of the UDP that the protocol itself does not control the transfer speed, and the case where the communications are performed by use of the TCP.

38. The apparatus for measuring communications performance according to claim 32, wherein the process of judging whether or not the rate exceeds the threshold value while changing the value of the transfer speed of the one of the measurement-oriented packets by a monotone increasing method, is repeated a predetermined number of times, and there is estimated the available bandwidth of the network route in any one of the case where the communications are performed by use of the UDP that the protocol itself does not control the transfer speed, and the case where the communications are performed by use of the TCP.

39. The apparatus for measuring communications performance according to claim 32, wherein the process of judging whether or not the rate exceeds the threshold value while changing a value of the transfer speed of the one of the measurement-oriented packets by a monotone decreasing method, is repeated a predetermined number of times, and there is estimated the available bandwidth of the network route in any one of the case where the communications are performed by use of the UDP that the protocol itself does not control the transfer speed, and the case where the communications are performed by use of the TCP.

* * * * *

UNITED STATES PATENT AND TRADEMARK OFFICE
CERTIFICATE OF CORRECTION

PATENT NO. : 6,757,255 B1  
DATED : June 29, 2004  
INVENTOR(S) : Takeshi Aoki et al.

It is certified that error appears in the above-identified patent and that said Letters Patent is hereby corrected as shown below:

Column 22,
Line 24, delete "connected" and insert -- conceived --.

Column 24,
Line 65, delete "G" and insert -- C --.

Column 32,
Line 2, delete "time" and insert -- times --.

Signed and Sealed this

Twenty-third Day of November, 2004

JON W. DUDAS
*Director of the United States Patent and Trademark Office*

UNITED STATES PATENT AND TRADEMARK OFFICE
CERTIFICATE OF CORRECTION

PATENT NO.     : 6,757,255 B1
DATED          : June 29, 2004
INVENTOR(S)    : Takeshi Aoki et al.

It is certified that error appears in the above-identified patent and that said Letters Patent is hereby corrected as shown below:

Column 21,
Line 62, after "receipt" insert -- timing --.

Column 23,
Line 50, before "occurence" insert -- an --.

Column 24,
Line 63, after "by" insert -- a --.

Column 27,
Line 51, change "Interconnect" to -- Interconnection --.

Signed and Sealed this

Sixth Day of September, 2005

JON W. DUDAS
*Director of the United States Patent and Trademark Office*